United States Patent
Balk

(10) Patent No.: US 9,434,549 B2
(45) Date of Patent: Sep. 6, 2016

(54) ACCUMULATING PORTAL CONVEYOR

(71) Applicant: Specialty Conveyor B.V., Zwagg (NL)

(72) Inventor: Wouter Balk, Baambrugge (NL)

(73) Assignee: SPECIALTY CONVEYOR B.V., Zwaag (NL)

( * ) Notice: Subject to any disclaimer, the term of this patent is extended or adjusted under 35 U.S.C. 154(b) by 0 days.

(21) Appl. No.: 14/749,216

(22) Filed: Jun. 24, 2015

(65) Prior Publication Data
US 2015/0375941 A1 Dec. 31, 2015

(30) Foreign Application Priority Data

Jun. 26, 2014 (NL) ...................................... 2013073

(51) Int. Cl.
| | | |
|---|---|---|
| B65G 13/02 | (2006.01) | |
| B65G 21/18 | (2006.01) | |
| B65G 21/22 | (2006.01) | |
| B65G 47/51 | (2006.01) | |
| B65G 21/14 | (2006.01) | |

(52) U.S. Cl.
CPC ............... *B65G 21/18* (2013.01); *B65G 21/14* (2013.01); *B65G 21/22* (2013.01); *B65G 47/5122* (2013.01); *B65G 2207/24* (2013.01)

(58) Field of Classification Search
CPC . B65G 47/268; B65G 47/5131; B65G 21/14
USPC ......................................... 198/594, 812, 778
See application file for complete search history.

(56) References Cited

U.S. PATENT DOCUMENTS

| | | | | |
|---|---|---|---|---|
| 4,549,647 A | * | 10/1985 | Cosse ................ | B65G 47/5131 198/461.1 |
| 6,591,963 B2 | * | 7/2003 | Wipf .................. | B65G 47/5122 198/347.2 |
| 7,219,788 B2 | * | 5/2007 | Tuck ................... | B65G 47/5122 198/347.2 |
| 8,365,905 B2 | * | 2/2013 | Fege .................... | B65G 17/086 198/347.1 |
| 9,145,270 B2 | * | 9/2015 | Touitou .............. | B65G 47/5131 |
| 2015/0021143 A1 | * | 1/2015 | Seger ....................... | B65G 1/04 198/347.1 |

FOREIGN PATENT DOCUMENTS

| | | |
|---|---|---|
| EP | 0738478 | 10/1996 |
| WO | 0198187 | 12/2001 |
| WO | 2014073961 | 5/2014 |

OTHER PUBLICATIONS

Search Report and Written Opinion for corresponding foreign application No. NL2013073, filed Jun. 26, 2014.

* cited by examiner

*Primary Examiner* — William R Harp
(74) *Attorney, Agent, or Firm* — Steven M. Koehler; Westman, Champlin & Koehler, P.A.

(57) ABSTRACT

An accumulating portal conveyor comprises a conveyor belt, a frame for supporting and guiding the belt, which frame includes a first helical path and a second helical path spaced from the first helical path, a bridging path and a return path. Under operating conditions the belt successively follows the first helical path upwardly, the bridging path, the second helical path downwardly and the return path, and such that in transverse direction of an upright plane through central centerlines of the first and second helical paths. The bridging path includes a static part having a fixed position with respect to the helical paths and a dynamic portion displaceable in transverse direction of the upright plane to change the path length of the belt. At least a portion of the return path is displaceable for compensating the change of the path length of the belt at the bridging path.

17 Claims, 20 Drawing Sheets

ACCUMULATING PORTAL CONVEYOR

BACKGROUND

The discussion below is merely provided for general background information and is not intended to be used as an aid in determining the scope of the claimed subject matter.

Aspects of the present invention relate to an accumulating portal conveyor, comprising a drivable endless conveyor belt, a frame for supporting and guiding the conveyor belt, which frame is provided with a first helical path and a second helical path which lies at a distance from the first helical path, a bridging path and a return path, which are arranged such that under operating conditions the conveyor belt successively follows the first helical path upwardly, the bridging path, the second helical path downwardly and the return path, and such that in transverse direction of an upright plane through central centerlines of the first and second helical path a free passage below the bridging path and between the helical paths is provided.

A portal conveyor is known from WO 2014/073961. The known portal conveyor has a frame with two helical conveyor paths, a bridging path and a return path. A supply location is present at the lower side of the first helical path where articles are placed on a conveyor belt and a discharge location is present at the lower side of the second helical path where articles are removed from a conveyor belt. The free passage provides, for example, the possibility to allow another transport through the conveyor without obstructing the flow of articles in the portal conveyor. In some processes the supply speed of articles varies at the first helical path with respect to the discharge speed of articles at the second helical path. This problem can be solved with the known portal conveyor by applying separate conveyor belts at the helical paths and the bridging path and temporarily drive them at different speeds. However, a disadvantage thereof is that transfers between conveyor belts are present which may cause instability of the articles to be transported. This is particularly undesired in case of a portal conveyor, because its height makes managing of possible problems difficult.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the disclosure is an accumulating portal conveyor, wherein the bridging path is provided with a static part having a fixed position with respect to the helical paths and a dynamic part which is displaceable in transverse direction of the upright plane so as to be able to change the path length of the conveyor belt between the helical paths, and wherein at least a portion of the return path is displaceable with respect to the helical paths for compensating the change of the followed path of the conveyor belt at the bridging path.

An advantage of the accumulating portal conveyor is that the capacity of the conveyor belt between a supply location at the first helical path and a discharge location at the second helical path is variable, such that articles can be buffered. Since at least a portion of the bridging path is displaceable in transverse direction of the upright plane, the extra capacity of the conveyor belt does not necessarily obstruct the free passage and it is not necessary to occupy space near the floor around the helical paths. It is noted that it is not required to displace the dynamic part perpendicularly to the upright plane. This can be a different angle, depending on the mutual position of the helical paths.

Considering the accumulating portal conveyor under operating conditions the conveyor belt can be divided in a conveyor section where articles are transported and a return section where no articles are transported but serves to move the conveyor belt back to the start of the conveyor section. In practice the conveyor section may extend from a supply location at the lower side of the helical path via the first helical path in upward direction, along the bridging path and via the second helical path in downward direction up to a discharge location at the lower side of the second helical path. The return section runs from the discharge location via the return path up to a supply location.

In a practical embodiment the static part of the bridging path has two parallel legs which extend in transverse direction of the upright plane and the dynamic part of the bridging path has a U-shape including two parallel legs as seen from above, wherein the dynamic part is displaceable in longitudinal direction of the parallel legs and the respective legs of the static part and dynamic part cooperate for supporting and guiding the conveyor belt via the U shape in different positions of the dynamic part. Displacing the U-shaped dynamic part along the parallel legs leads to using a longer or shorter portion of the parallel legs of the static part for supporting and guiding the conveyor belt. The legs of the dynamic part may be short and possibly not exactly parallel, but the legs will be directed in parallel direction at their free ends such that they can cooperate with the respective parallel legs of the static part.

The return path may also be provided with a static part which has a fixed position with respect to the helical paths and a dynamic part which is displaceable in transverse direction of the upright plane. The return path may be configured in a similar way as the bridging path, wherein also a U-shaped dynamic part is present including parallel directed legs which cooperate with parallel legs of a static part.

The dynamic part of the bridging path and the dynamic part of the return path may be arranged such that they move in opposite directions upon changing the path length of the conveyor belt at the bridging path under operating conditions. The dynamic part of the bridging path and the dynamic part of the return path may be connected to each other via a chain or belt or the like with a reversing wheel in order to synchronize such movements.

In an advantageous embodiment the return path is located at least in a portion between the first and second helical path below the bridging path and is adapted such that the free passage is provided between the helical paths below the return path. In this case the accumulating portal conveyor forms a U-shaped passage in a direction perpendicular to the plane through the central centerlines of the helical paths. In order to make the passage as high as possible the return path between the helical paths is preferably located at least partially directly below the bridging path. For example, the distance between the bridging path and the return path is smaller than the covered distance in vertical direction after following two windings of the helical paths. Because of the displacements of the dynamic part of the bridging path and the dynamic part of the return path, the return path is not always located exactly below the bridging path; hence, as seen from above they do not always overlap each other under operating conditions.

In an alternative embodiment the dynamic part of the bridging path and the dynamic part of the return path are arranged such that they move in the same direction upon changing the path length of the conveyor belt along the bridging path under operating conditions. In a practical embodiment this is created by reversing the conveyor belt, which is guided upside down via the parallel legs of the static part of the return path, at the free ends of the parallel legs via 180 bends, such that the conveyor belt follows the dynamic part of the return path and the upper side of the conveyor belt is directed upwardly. In the latter case the return path extends at substantially the same height as the bridging path, which makes a higher free passage possible.

The U-shaped dynamic part of the bridging path may be provided with a radial guide for supporting the conveyor belt in radial direction via the U-shape, an outer vertical guide for supporting an outer curve portion of the conveyor belt in upward direction and an inner vertical guide for supporting an inner curve portion of the conveyor belt in upward direction, wherein the outer vertical guide and inner vertical guide support opposite side edge portions of the conveyor belt, wherein the static part is provided with an outer vertical guide for supporting an outer edge portion of the conveyor belt in upward direction and an inner vertical guide for supporting an inner edge portion of the conveyor belt in upward direction, as seen from the inner side of the U-shape, wherein at the dynamic part at least the inner vertical guide of the static part is free form the dynamic part.

The upwardly directed support of the side edge portions of the conveyor belt allows transporting of heavy products including with a relatively wide conveyor belt, whereas it is not required to make the conveyor belt of very rigid and heavy material.

In a practical embodiment the radial guide may be located between the inner and outer vertical guide in horizontal direction.

It is noted, that such a U-shaped dynamic part is also applicable in linear accumulating conveyors and may be independent from the helical paths. In other words, another aspect of the disclosure is also related to:

A buffer conveyor, comprising a drivable endless conveyor belt, a frame for supporting and guiding the conveyor belt, which frame is provided with a transport path and a return path, which are arranged such that under operating conditions the conveyor belt successively follows the transport path and the return path, wherein the transport path is provided with a static part and a dynamic part which is displaceable with respect to the static part for changing the path length of the conveyor belt at the transport path, and wherein the return path is provided with a static part and dynamic part which is displaceable with respect to the static part for compensating the change of the path length of the conveyor belt at the transport path, wherein the static part of the conveyor belt has two parallel legs and the dynamic part of the transport path has a U-shape including two parallel legs as seen from above, wherein the dynamic part of the transport path is displaceable in longitudinal direction of the parallel legs of the static part and the respective legs of the static part and dynamic part of the transport path cooperate so as to support and guide the conveyor belt in different positions of the dynamic part via the U-shape, wherein the U-shaped dynamic part is provided with a radial guide for supporting the conveyor belt in radial direction via the U-shape, an outer vertical guide for supporting an outer curve portion of the conveyor belt in upward direction, an inner vertical guide for supporting an inner curve portion of the conveyor belt in upward direction, wherein the outer vertical guide and inner vertical guide support opposite side edge portions of the conveyor belt, wherein the static part is provided with an outer vertical guide for supporting an outer edge portion of the conveyor belt in upward direction and an inner vertical guide for supporting an inner edge portion of the conveyor in upward direction, as seen from the inner side of the U-shape, wherein at the dynamic part at least the inner vertical guide of the static part is free form the dynamic part.

In this case the helical paths and the bridging path are replaced by a transport path. The static part and the dynamic part of the return path can be configured in a similar way as the transport path.

The specific features presented hereinafter are applicable in the accumulating portal conveyor as well as in the buffer conveyor.

An adjusting device may be present for displacing the inner vertical guide of the static part at the dynamic part in vertical direction upon displacing the dynamic part.

An adjusting device may be present for displacing the inner vertical guide of the static part at the dynamic part in lateral direction upon displacing the dynamic part.

At least a portion of the inner vertical guide of the static part may be connected to the dynamic part in such a manner that the inner vertical guide also displaces in the direction of displacement of the dynamic part.

The inner vertical guide of the static part may lie at the dynamic part below the dynamic part. In that case a mechanism for displacing the inner vertical guide of the static part is not required when the dynamic part passes. Such a configuration is possible, for example, if the conveyor belt has a projection at the inner vertical guide.

The radial guide may be located between the outer vertical guide and the inner vertical guide in horizontal direction. In an alternative embodiment the radial guide may be located at a side of the inner vertical guide facing the inner side of the U-shape in horizontal direction. The radial guide can support and guide the side edge of the conveyor belt, for example.

In a practical embodiment at least at the dynamic part the outer vertical guide of the static part is located beyond the outer vertical guide of the dynamic part in horizontal direction, as seen from the inner side of the U-shape. An advantage of this embodiment is that no changes at the outer vertical guide of the static part are required for allowing the dynamic part to pass.

BRIEF DESCRIPTION OF THE DRAWINGS

Aspects of the invention will hereafter be elucidated with reference to drawings showing embodiments very schematically.

DETAILED DESCRIPTION OF THE ILLUSTRATIVE EMBODIMENTS

Figure 1:
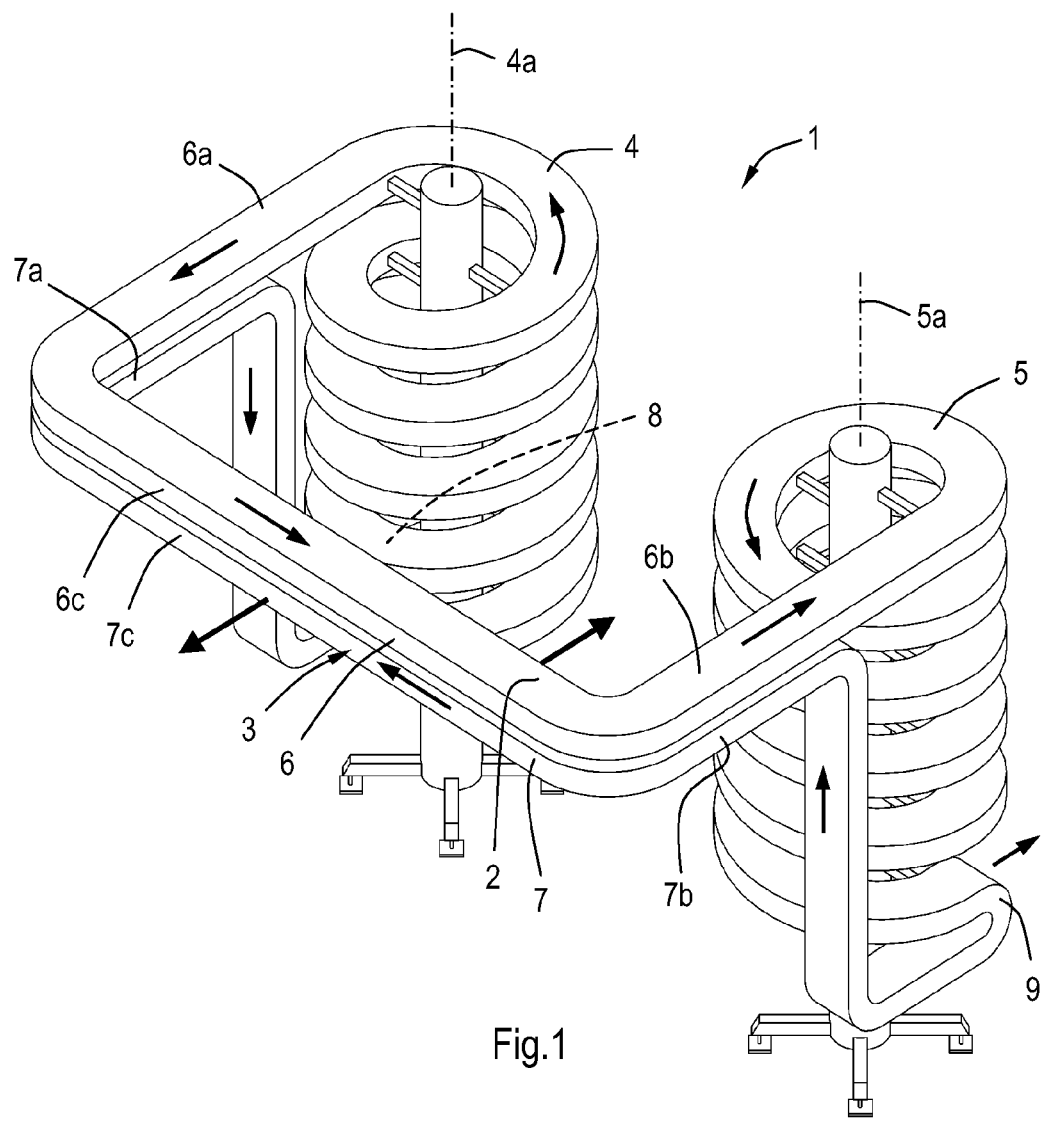
FIG. 1 is a perspective plan view of an embodiment of an accumulating portal conveyor.
Figure 2:
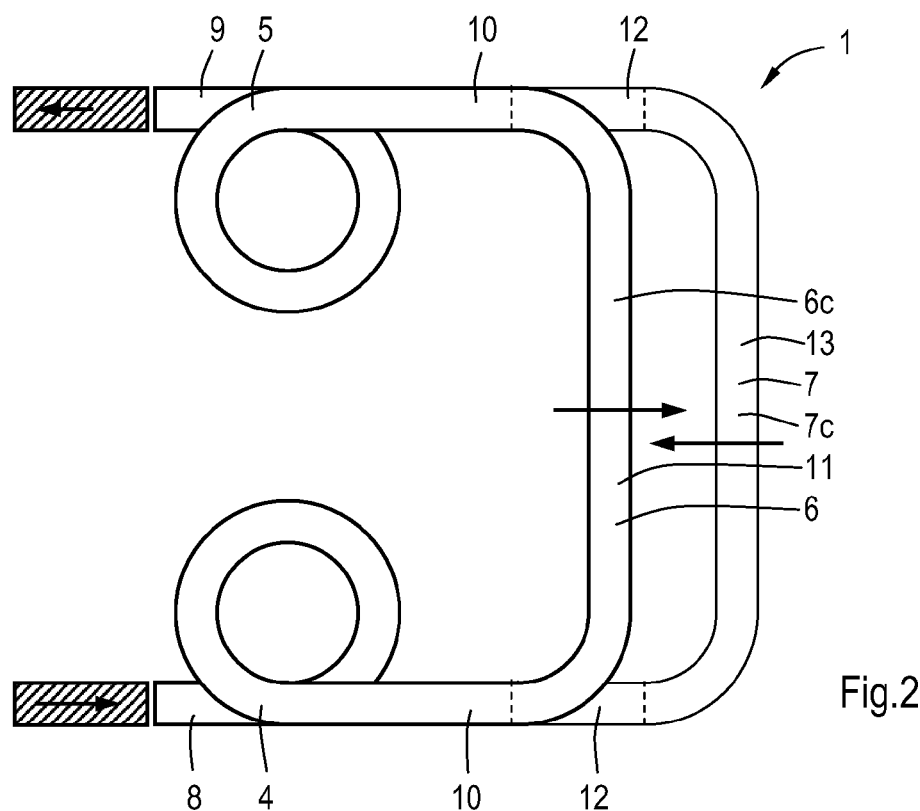
FIG. 2 is an illustrative plan view of the accumulating portal conveyor according to FIG. 1.

FIG. 1 shows an embodiment of an accumulating portal conveyor 1. The accumulating portal conveyor 1 comprises a drivable endless conveyor belt 2 and a frame 3 for supporting and guiding the conveyor belt 2. In FIG. 1 the difference between the conveyor belt 2 and the frame 3 is not shown in detail. The frame 3 is provided with a first helical path 4 and a second helical path 5 which lies at a distance from the first helical path 4, a bridging path 6 and a return path 7. The bridging path 6 connects the upper sides of the first helical path 4 and the second helical path 5 to each other. The bridging path 6 has two parallel legs 6a, 6b which extend horizontally and which are tangentially connected to the respective helical paths 4, 5 as seen from above. In this case the legs 6a, 6b are connected at outer sides of the helical paths 4, 5 which are at greatest distance from each other, but that is not required. At a distance from the helical paths 4, 5 the legs 6a, 6b of the bridging path 6 are coupled to a base leg 6c via respective right-angled bends, such that the bridging path 6 is U-shaped as seen from above.

The return path 7 connects the lower sides of the first helical path 4 and the second helical path 5 to each other. Similar to the bridging path the return path 7 also has a base leg 7c, which extends directly below the base leg 6c of the bridging path 6 and is parallel with the bridging path 6. The return path 7 in the embodiment as shown also has two legs 7a, 7b which are partially parallel to and extend directly below the respective legs 6a, 6b of the bridging path 6. Therefore, the return path 7 is also U-shaped as seen from above. Close to the respective helical paths 4, 5 the return path bends downwardly as seen from the base leg 7c and two vertical portions of the return path 7 extend along the outer sides of the respective helical paths 4, 5. Hence, in this embodiment the return path 7 follows the shortest route back along the helical paths 4, 5. At the lower sides of the helical paths 4, 5 portions of the return path 7 extend horizontally and connect to the respective helical paths 4, 5. The conveyor belt 2 is reversed at those locations, for example by means of reversing rollers.

Under operating conditions the conveyor belt 2 successively follows the first helical path 4 in upward direction, the U-shaped bridging path 6, the second helical path 5 in downward direction and the U-shaped return path 7. A supply location 8 for receiving articles coming from a supply conveyor (not shown in FIG. 1) on the conveyor belt 2 is located at the lower side of the first helical path 4. A discharge location 9 for removing articles from the conveyor belt 2 to a discharge conveyor (not shown in FIG. 1) is located at the lower side of the second helical path 5. The conveyor belt 2 has an upper side or article-supporting side which is directed in upward direction during following the helical paths and the bridging path 6, but which is directed downwardly in the horizontal tracks of the return path 7 because of the arrangement as shown.

The conveyor belt 2 is flexible in a direction perpendicular to its upper side and in lateral direction with respect to the conveying direction thereof. Therefore, the conveyor belt 2 can follow horizontal bends and vertical bends. The conveyor belt 2 can be provided with mutually coupled and mutually movable slats. The slats can be coupled to each other via a drivable endless connecting member, for example a chain to which a central portion of each slat is coupled.

The helical paths 4, 5 have respective central centerlines 4a, 5a which lie in a vertical plane. The accumulating portal conveyor 1 has a free passage in transverse direction of the vertical plane. As seen in transverse direction of the vertical plane the free passage is bordered at its upper side by the upper side of the conveyor belt 2 which is directed downwardly at the return path 7, and bordered laterally by the helical paths 4, and bordered at the bottom side by the floor. The accumulating portal conveyor 1 has a reversed U-shape as seen in a direction through the free passage.

Portions of the bridging path 6 and the return path 7 are displaceable with respect to the helical paths 4, 5 in transverse direction of the vertical plane through the central centerlines 4a, 4b. This means that the path length of the conveyor belt 2 between the helical paths 4, 5 at the bridging path 6 are changed, such that the accumulating portal conveyor 1 provides a buffer function. The possible displacement of the portions of the bridging path 6 and the return path 7 is indicated by means of arrows in FIG. 1.

The buffer function is explained with reference to FIGS. 2-8. These Figs. show the upper side of the embodiment according to FIG. 1 in an illustrative manner; for explanatory reasons several details are not shown. The bridging path 6 is provided with a static part 10 and a dynamic part 11. The static part 10 comprises two parallel legs which have a fixed position with respect to the helical paths 4, 5 and extend in transverse direction of the vertical plane. As seen from above the dynamic part 11 has a U-shape including the base leg 6c and two short parallel legs. For illustrative reasons the transfer between the static part 10 and the dynamic part 11 is indicated by means of broken lines. The short parallel legs of the dynamic part 11 are displaceable with respect to respective legs of the static part 10 in longitudinal direction thereof. Although not shown in FIGS. 2-8 the parallel legs of the static part 10 thus extend in a direction from the vertical plane up to beyond the base leg 6c when the dynamic part 11 has not yet reached the position which lies at farthest distance in outward direction. In order to support and guide the conveyor belt 2 in different positions of the dynamic part 11 with respect to the static part 10, the respective legs of the static part 10 and the dynamic part 11 do cooperate. This will be described later in more detail.

The return path 7 is provided with a static part 12 and a dynamic part 13 in a similar way as the bridging path 6. The static part 12 comprises two parallel legs which have a fixed position with respect to the helical paths 4, 5 and extend in transverse direction of the vertical plane through the central centerlines 4a, 5a. The dynamic part 13 has a U-shape including the base leg 7c and two short parallel legs as seen from above. For illustrative reasons the transfer between the static part 12 and the dynamic part 13 is indicated by means of broken lines. The short parallel legs of the dynamic part 13 are displaceable with respect to respective legs of the static part 12 in longitudinal direction thereof. The respective legs of the static part 12 and dynamic part 13 cooperate in order to support and guide the conveyor belt 2 in the return path 7 in different positions of the dynamic part 13 with respect to the static part 12. It is noted that at the dynamic part 13 and the adjacent horizontal portion of the static part 12 the conveyor belt 2 at the return path 7 suspends such that the article-supporting side is directed downwardly. In this case the parallel legs of the static part 12 extend in a direction from the vertical plane up to beyond the base leg 7c when the dynamic part 13 has not yet reached the position which lies at farthest distance in outward direction.

FIGS. 2-8 illustrate the accumulating portal conveyor 1 according to FIG. 1 as seen from above in different positions of the dynamic part 11 of the bridging path 6 and the dynamic part 13 of the return path 7. Arrows in FIG. 2 at a supply conveyor located upstream of the supply location 8 and at a discharge conveyor located downstream of the discharge location 9 indicate that in the situation as shown a higher flow of articles is supplied to the accumulating portal conveyor 1 than discharged therefrom. Since in this situation a higher buffer capacity is desired the dynamic part 11 of the bridging path 6 will move away as seen from the vertical plane through the central centerlines 4a, 5a, such that the path length of the conveyor belt 2 at the bridging path increases. In order to compensate this extension the dynamic part 13 of the return path 7 moves in opposite direction. Consequently, the effective length of the conveyor belt 2 is shortened along the return path.

Figure 3:
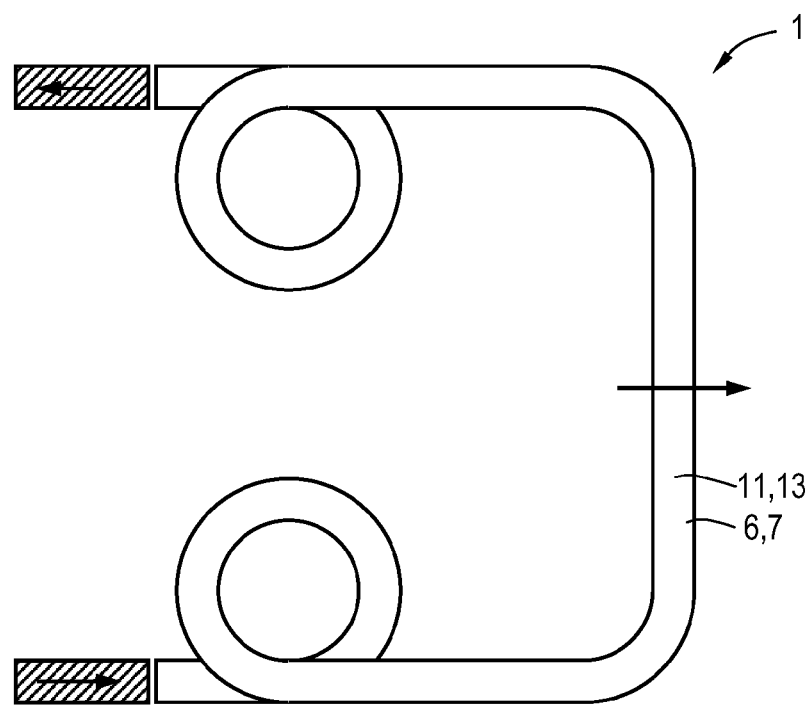
FIGS. 3-8 are the same views as FIG. 2 and illustrate different operating conditions of the accumulating portal conveyor.
Figure 4:
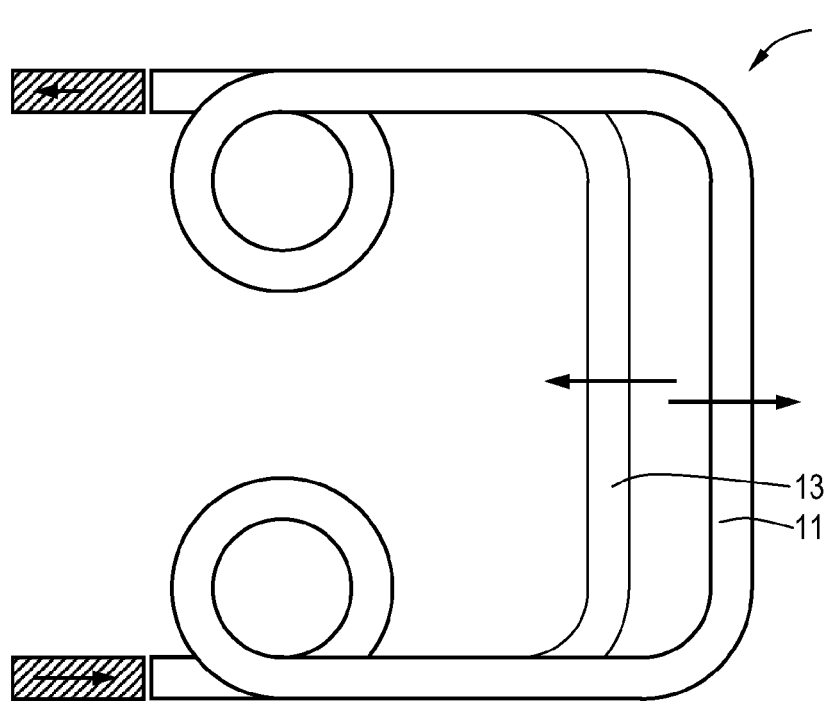
Figure 5:
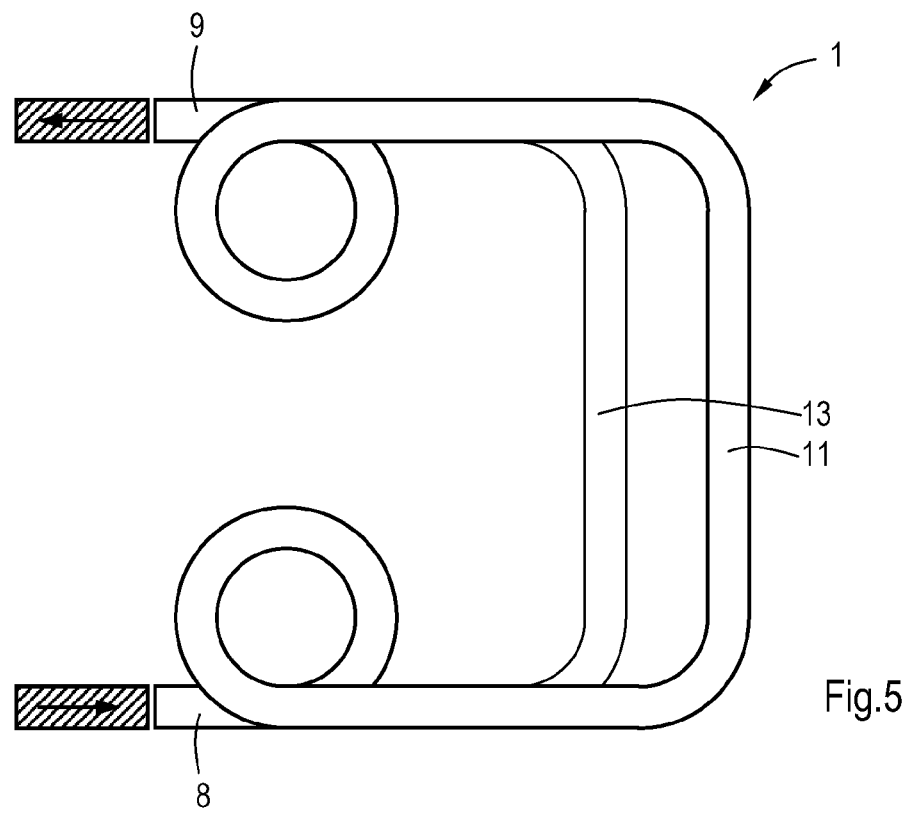

FIG. 3 shows a next situation in which the dynamic part 11 of the bridging path 6 lies exactly above the dynamic part 13 of the return path 7. In the situation according to FIG. 4 the dynamic parts 11, 13 are moved further with respect to the situation as shown in FIG. 3. FIG. 5 illustrates a situation in which the positions of the dynamic parts 11, 13 are kept the same, since a balanced condition between the supply flow and the discharge flow has been reached; this is indicated with arrows of equal length upstream of the supply location 8 and downstream of the discharge location 9.

Figure 6:
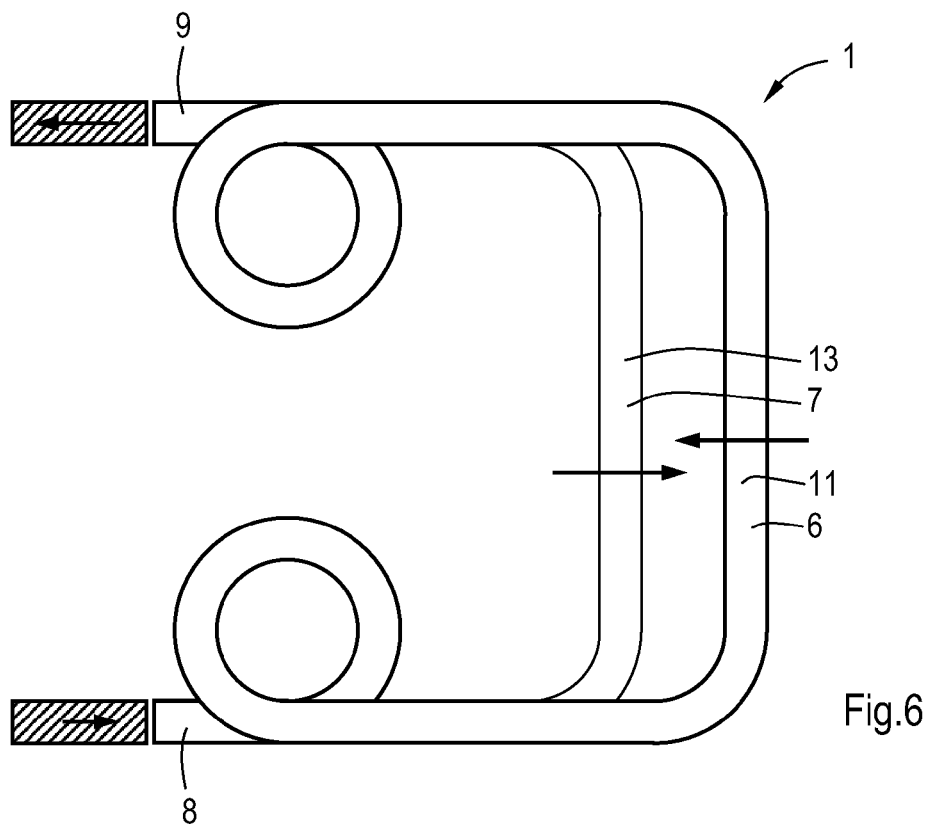
Figure 7:
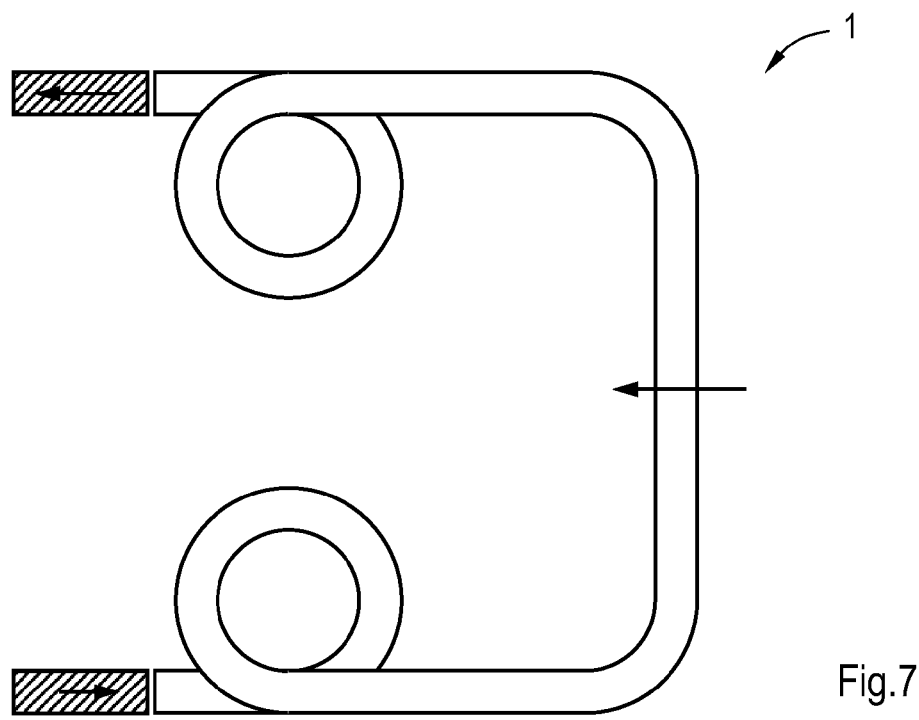
Figure 8:
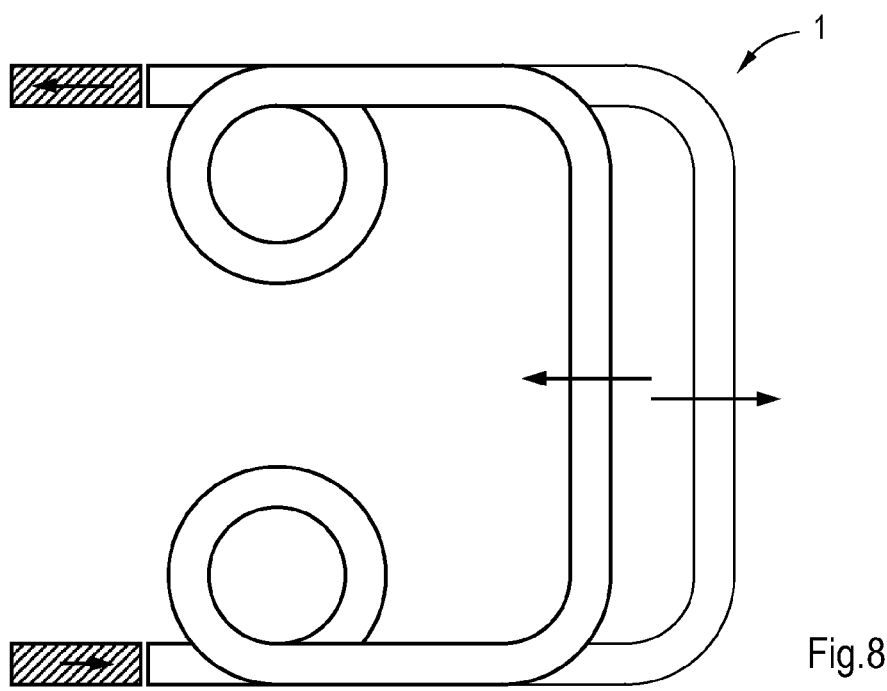

FIGS. 6-8 illustrate a reversed situation. The arrows at the supply conveyor upstream of the supply location 8 and at the discharge conveyor downstream of the discharge location 9 indicate that a larger flow of articles can leave the accumulating portal conveyor 1 than can be supplied to it. Therefore the buffer can be emptied, thus the dynamic part 11 of the bridging path 6 is moved in a direction of the vertical plane through the central centerlines 4a, 5a in order to shorten the path length of the conveyor belt 2 at the bridging path 6.

The dynamic part 11 of the bridging path 6 and the dynamic part 13 of the return path 7 can be connected to each other by means of a belt or chain with a reversing wheel such that the reversed movements as shown in FIGS. 2-8 are obtained.

Figure 9:
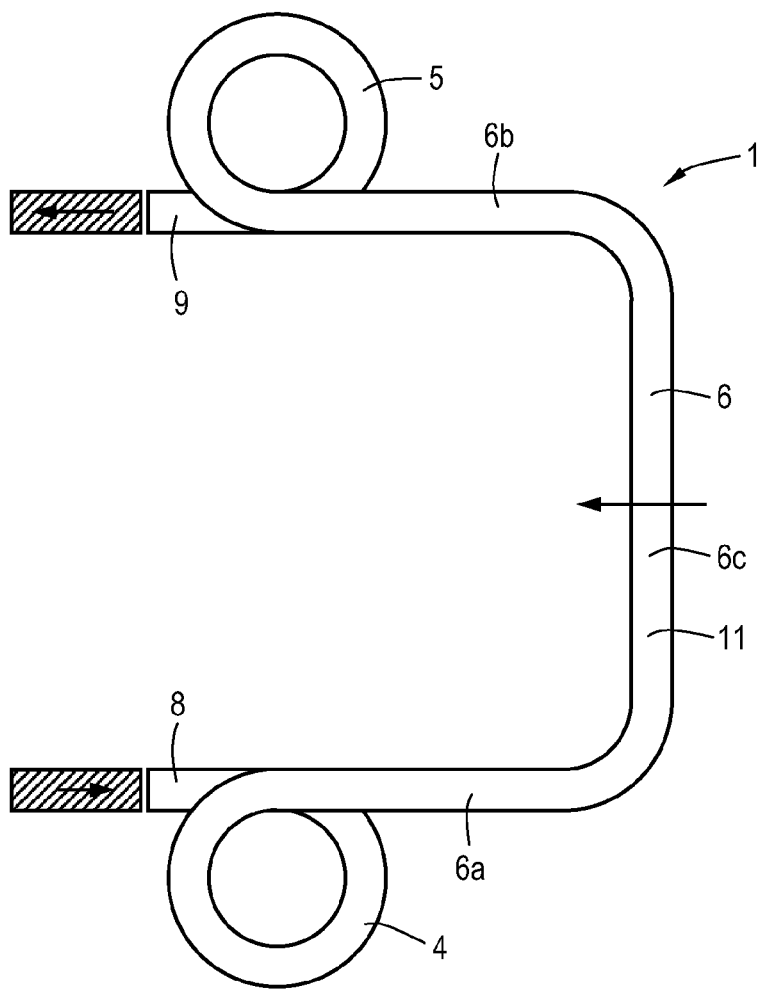
FIG. 9 is the same view as FIG. 2, but shows an alternative embodiment.

FIG. 9 shows an alternative embodiment of the accumulating portal conveyor 1. Compared to the embodiment according to FIGS. 1-8 the parallel legs 6a, 6b of the bridging path connect tangentially to the respective helical paths 4, 5 as seen from above, but now at outer sides of the helical paths 4, 5 which are located closest to each other. It will be clear that numerous alternatives are possible.

Figure 10:
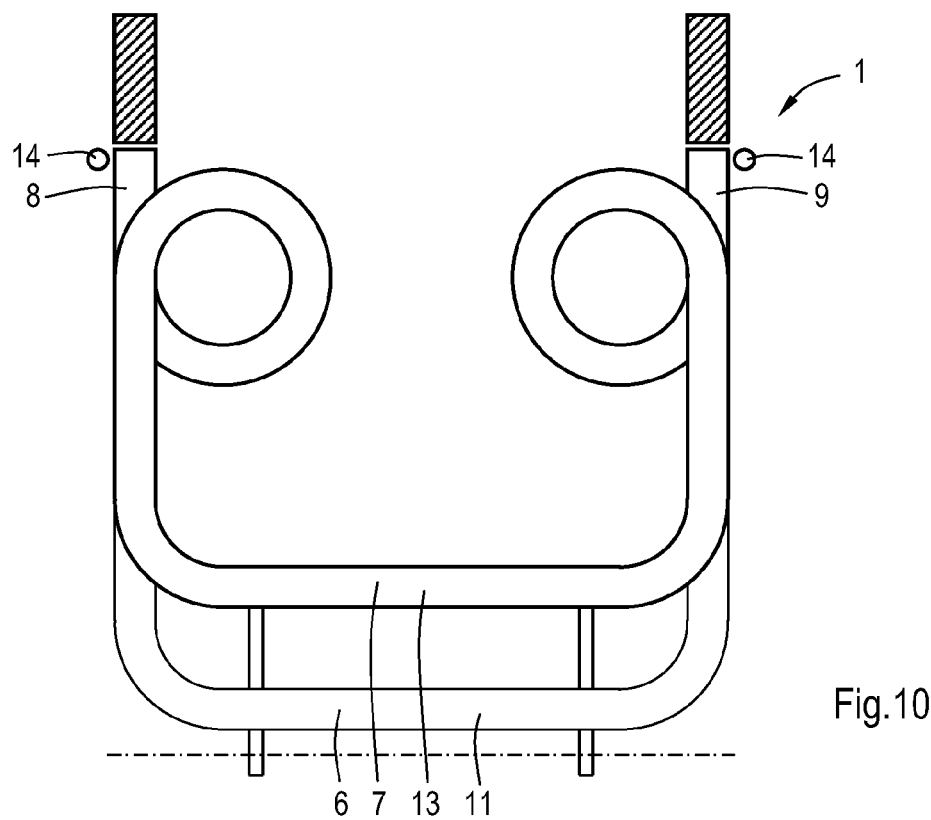
FIG. 10 is the same view as FIG. 1, but shows the drive means of the conveyor belt, as well.
Figure 11:
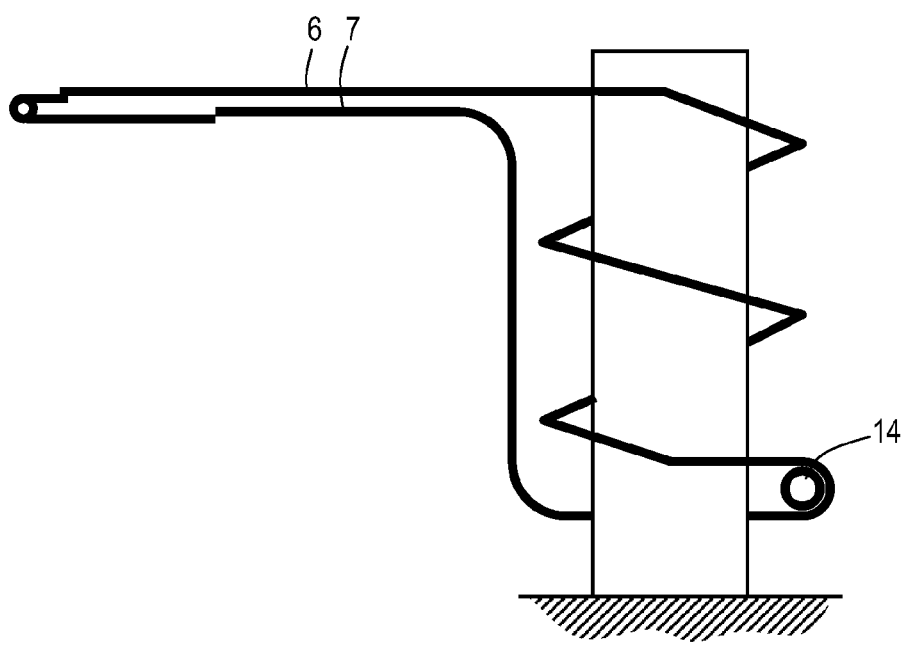
FIG. 11 is a side view of the embodiment as shown in FIG. 10.

FIGS. 10-17 illustrate variations in respect of the track followed by the return path 7 and locations of drive means for the conveyor belt 2. The embodiment according to FIGS. 10 and 11 is similar to the embodiment according to FIGS. 1-8. It can be seen that two drive motors 14 for driving the conveyor belt 2 are present at the supply location 8 and the discharge location 9. The dynamic parts 11, 13 can be displaced automatically by driving the drive motors 14 at different drive speeds.

Figure 12:
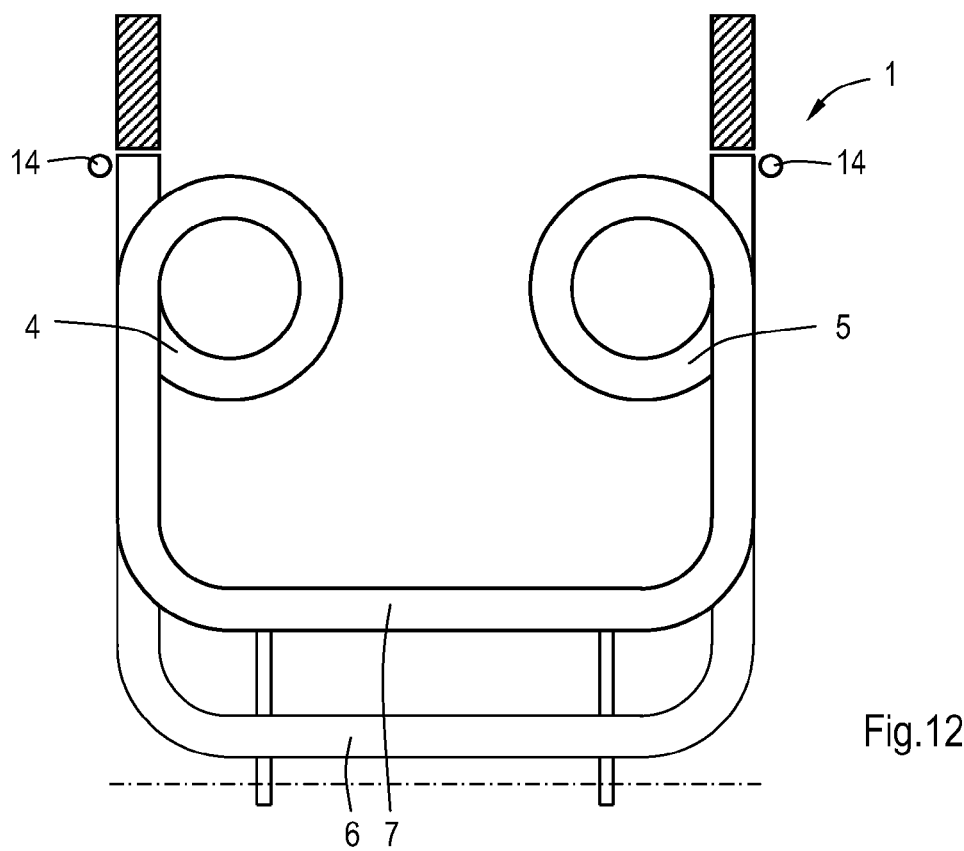
FIGS. 12 and 13, 14 and 15, and 16 and 17 are the same views as FIGS. 10 and 11, but show alternative embodiments.
Figure 13:
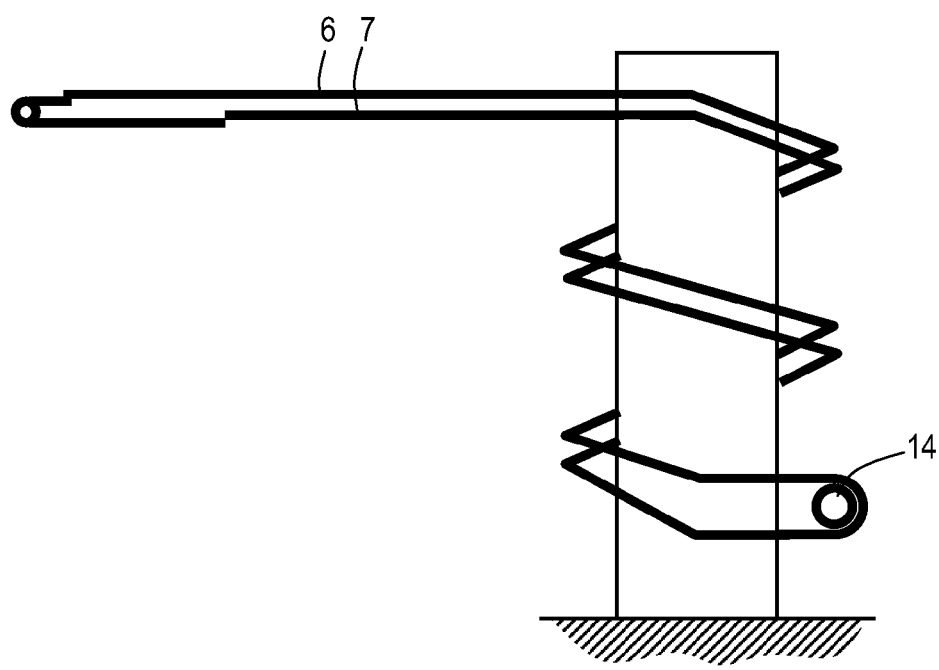

In the embodiment according to FIGS. 12 and 13 the return path 7 extends parallel to the helical paths 4, 5 at the lower sides thereof. In the portion of the return path 7 which follows the helical paths 4, 5 the conveyor belt 2 suspends upside down. The track of the return path 7 at the transfers between the horizontal portions of the return path 7 and the helical paths 4, 5 at the upper sides of the respective helical paths 4, 5 according to FIGS. 12 and 13 follows an easier path than in the embodiment according to FIGS. 10 and 11 because of the lack of right-angled bends or so-called counter bends. As can be seen in FIG. 11 the conveyor belt 2 has to bend about the upper side thereof which requires a relatively large radius in practice. Possibly, at these right-angled bends there may be rollers for guiding the upper side of the conveyor belt 2 upon changing its direction from vertical to horizontal and reversed. In practice it may be desired to omit rollers at these transfers since they are sensitive to debris which may be present on the upper side of the conveyor belt 2. Besides, the upper side of the conveyor belt is often provided with a relief such that supporting in a stable way becomes difficult.

Figure 14:
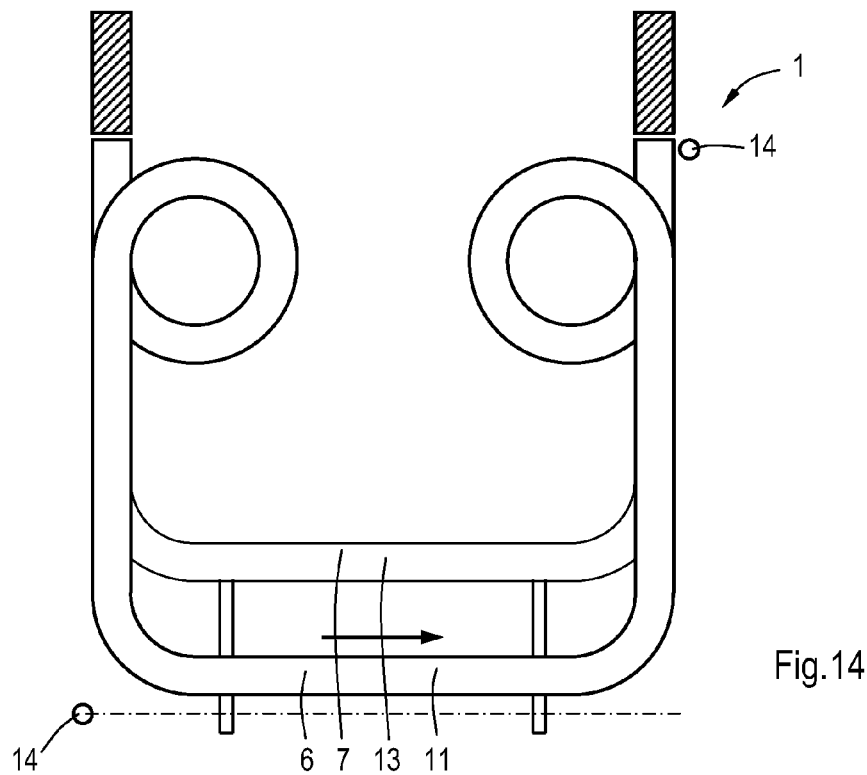
Figure 15:
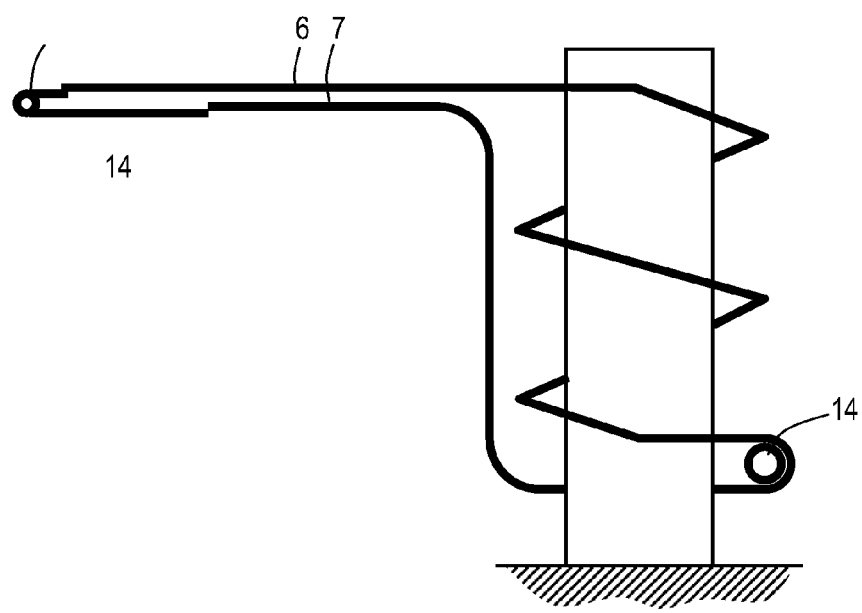

FIGS. 14 and 15 show an embodiment which is comparable with the embodiment according to FIGS. 10 and 11, but in this case one of the drive motors 14 drives a mechanism for displacing the dynamic parts 11, 13. The manner of control of the embodiment according to FIGS. 10 and 11 is simpler, since the control of the drive motors 14 can be integrated in a complete process control and can be controlled on the basis of speeds of supply and discharge conveyors of the accumulating portal conveyor 1. On the other hand the required pulling force in the embodiment according to FIGS. 10 and 11 is relatively high because of the presence of the counter bends.

Figure 16:
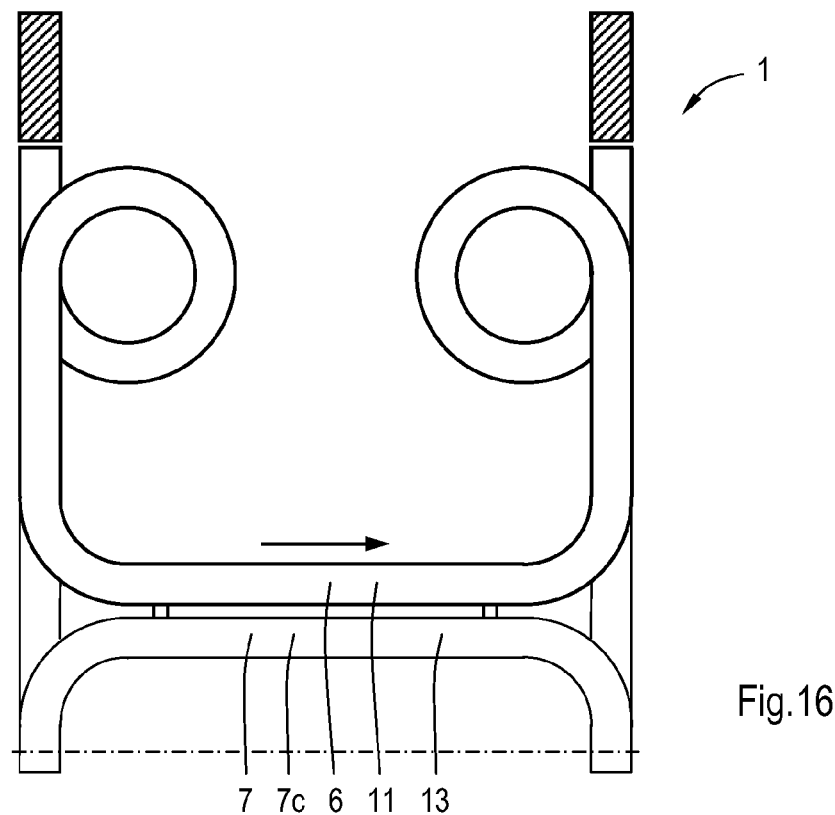
Figure 17:
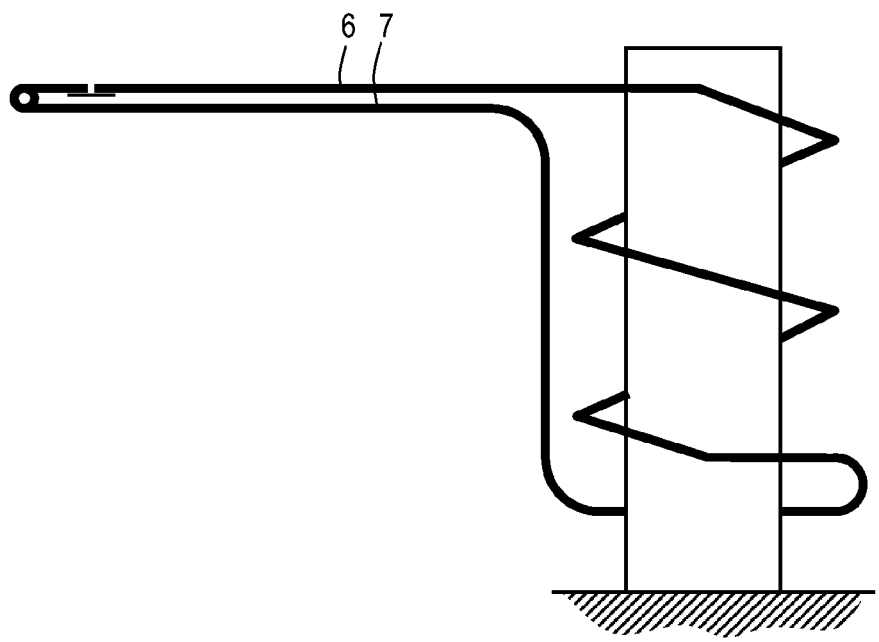

FIGS. 16 and 17 show an alternative embodiment, wherein the dynamic part 11 of the bridging path 6 and the dynamic part 13 of the return path 7 are arranged such that under operating conditions they move in the same direction upon changing the path length of the conveyor belt 2 along the bridging path 6. The dynamic part 13 of the return path also has a U-shape as seen from above, but the legs are now connected to the base leg 7c via extra 180 bends. At one of the 180° bends reversing rollers can be applied in order to allow the conveyor belt 2 to follow these bends. This configuration means that the conveyor belt 2 at the base leg 7c is not oriented upside down anymore. In the embodiment according to FIGS. 16 and 17 the bridging path 6 and the return path 7 lie between the helical paths at the same height level. Consequently, a more compact structure in vertical direction is obtained.

From the above description it is clear that the conveyor belt 2 can and must be supported and guided in different ways during moving forwardly via the helical paths 4, 5, the bridging path 6 and the return path 7. In at least a portion of the return path 7 the conveyor belt 2 suspends upside down from the frame 3. Furthermore, the conveyor belt 2 follows bends in lateral directions and about the upper side and the lower side of the conveyor belt 2. The conveyor belt 2 must always be supported and guided at the bridging path 6 upon displacement of the dynamic part 11 with respect to the static part 10 thereof. This also applies to supporting and guiding the conveyor belt 2 at the return path 7 upon displacement of the dynamic part 13 with respect to the static part 12 thereof.

Figure 18:
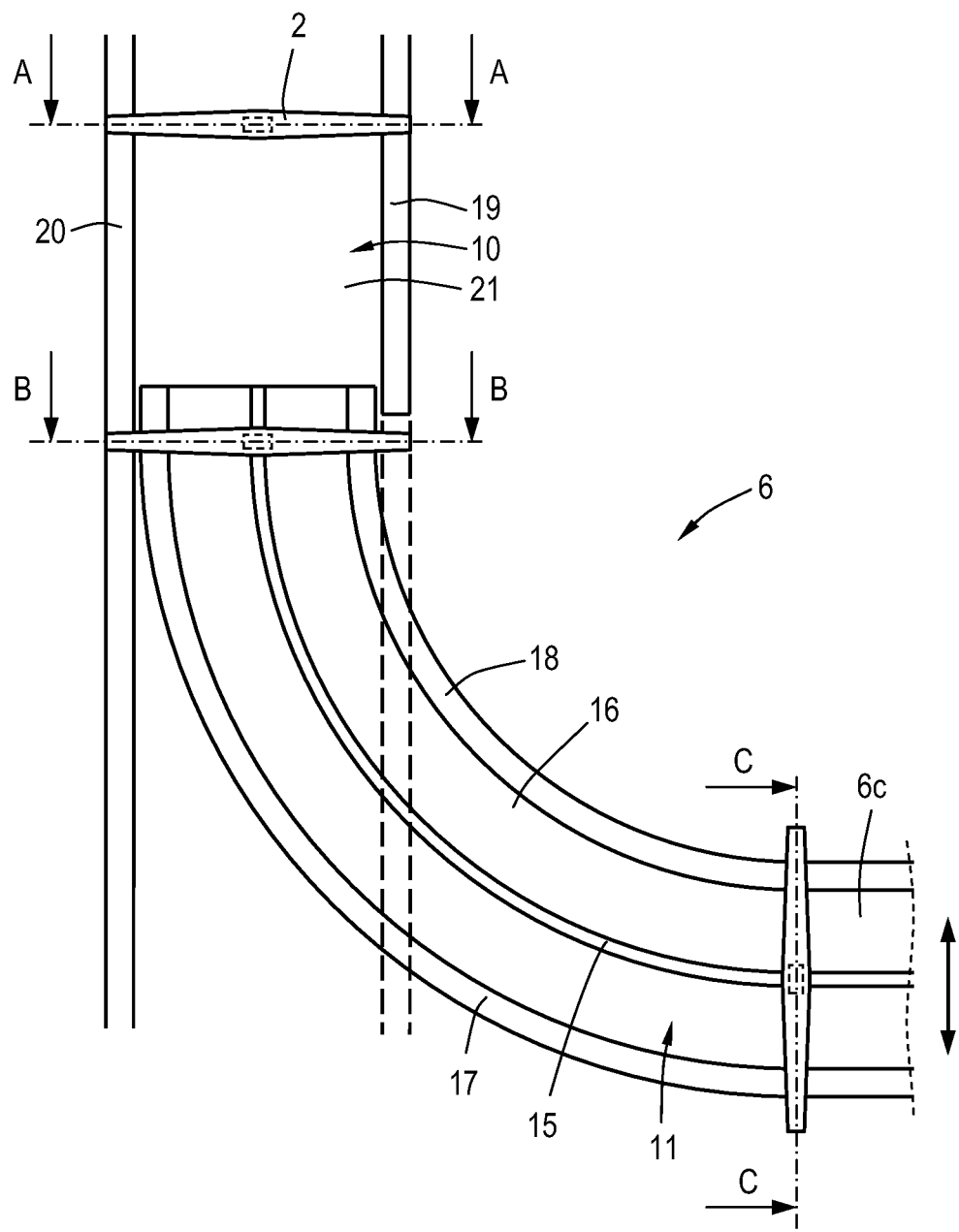
FIG. 18 is a detailed cut-away plan view of a part of an embodiment of an accumulating portal conveyor, showing the bridging path.
Figure 19:
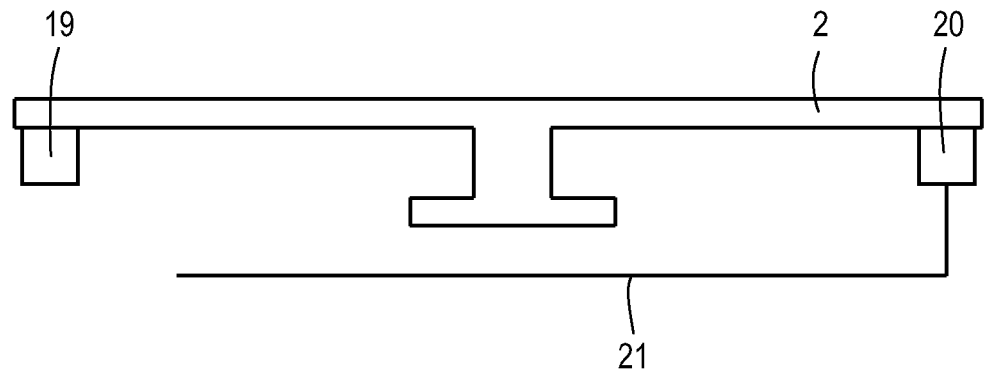
FIGS. 19-21 are enlarged cross-sectional views of the embodiment according to FIG. 18 along the respective lines AA, BB and CC in FIG. 18.
Figure 20:
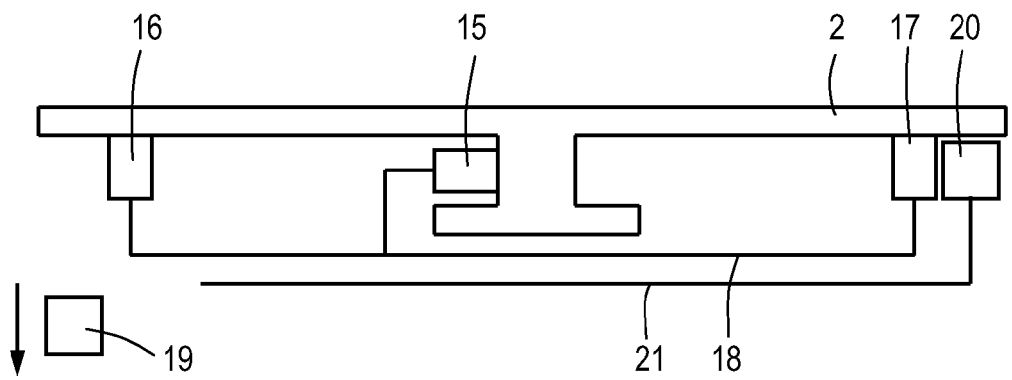
Figure 21:
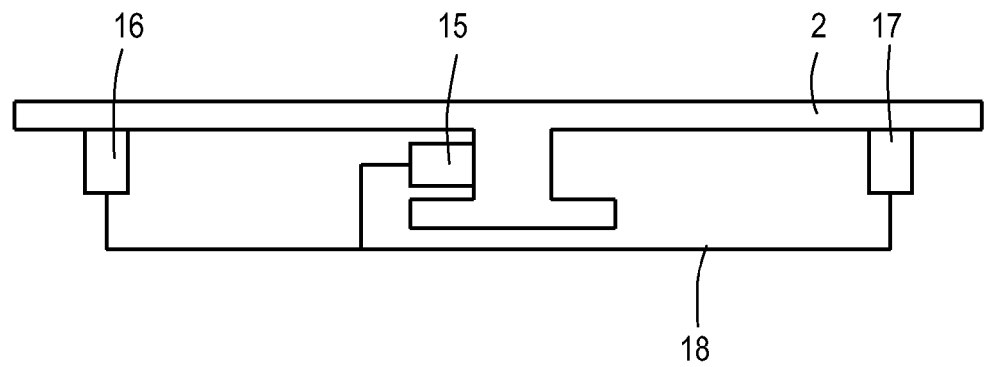

FIG. 18 shows a cut-away plan view in which a portion of the bridging path 6 of an embodiment of the accumulating portal conveyor 1 can be seen in more detail and FIGS. 19-21 show cross-sectional views at different locations along the bridging path 6, indicated by AA, BB, CC in FIG. 18, respectively. In this case the conveyor belt 2 is a slat conveyor belt. For illustrative reasons FIG. 18 shows three slats of the conveyor belt 2 and FIGS. 19-21 show the cross-sections at those slats. FIG. 18 shows one of the parallel legs of the static part 10 of the bridging path 6 and one of the parallel short legs of the dynamic part 11 of the bridging path 6 cooperating therewith. The dynamic part 11 is displaceable with respect to the static part 10 in longitudinal direction of the parallel legs of the static part 10, which is indicated by the double headed arrow in FIG. 18. In FIGS. 20 and 21 it can be seen that the conveyor belt 2 at the dynamic part 11 of the bridging path 6 is supported in transverse direction by a radial guide 15, which is intended to provide support in radial direction in the bends of the U-shape. In fact in the straight portion of the base leg 6c the radial support is not required. In principle a single guide for radially guiding in outward direction is also sufficient, but it is possible to apply an additional guide for guiding in inward direction. The radial guide 15 engages at a protruding portion at the lower side of the conveyor belt 2, which is located at the centerline of the conveyor belt 2. At this location the slats are connected to each other in a flexible way, directly or indirectly via an endless drive member, such as a chain.

Furthermore, the conveyor belt 2 is supported at the dynamic part 11 in upward direction via an inner vertical guide 16 and an outer vertical guide 17, see FIGS. 20 and 21. The guides 15, 16 and 17 comprise rails, for example, which are mounted on a horizontal plate 18. The inner vertical guide 16 supports an inner curve portion of the conveyor belt 2 in upward direction and the outer vertical guide 17 supports an outer curve portion of the conveyor belt 2 in upward direction. In the horizontal plane the radial guide 15 is located between the outer vertical guide 17 and the inner vertical guide 16. The inner curve portion of the conveyor belt 2 lies at the side of the centerline of the conveyor belt 2 which is directed to the inner side of the U-shape and the outer curve portion of the conveyor belt 2 lies at the side of the centerline of the conveyor belt 2 which is directed to the outer side of the U-shape. The inner vertical guide 16 and the outer vertical guide 17 support the conveyor belt 2 at side edge portions thereof. This is advantageous in that heavy articles can be transported without or with limited sagging of the conveyor belt 2. This provides the possibility of applying relatively wide conveyor belts. Possibly the conveyor belt 2 may be supported and guided in vertical direction at several locations between the inner vertical guide 16 and the outer vertical guide 17.

FIG. 19 shows a cross-section at the static part 10 of the bridging path 6. In this case the side edge portions of the conveyor belt 2 are supported at the inner side of the U-shape by an inner vertical guide 19 and an outer vertical guide 20 of the static part 10. The outer vertical guide 20 is mounted on a plate 21.

FIG. 20 shows a cross-section on a location where the dynamic part 11 is located above the static part 10. It can be seen herein that the outer curve portion of the conveyor belt 2 is supported by the outer vertical guide 17 of the dynamic part 11. The outer vertical guide 17 of the dynamic part 11 is located at the side of the outer vertical guide 20 of the static part 10 which is directed to the inner side of the U-shape. FIG. 20 shows that the outer vertical guide 20 of the static part 10 does not contact the conveyor belt 2; this could be allowable. FIG. 20 also shows that in this case the plate 18 of the dynamic part 11 lies above the plate 21 of the static part 10. The inner curve portion of the conveyor belt 2 is supported by the inner vertical guide 16 of the dynamic part 11. In order to prevent portions of the dynamic part 11 from contacting the inner vertical guide 19 of the static part 10 upon displacing with respect to the static part 10, the inner vertical guide 19 in the embodiment according to FIGS. 18-21 at the dynamic part 11 is moved downwardly such as indicated by an arrow in FIG. 20. For example, this can be achieved by applying an adjusting device (not shown), which is mounted to the dynamic part 11. In that way the inner vertical guide 19 of the static part 10 can be moved downwardly when the dynamic part 11 is displaced to a position for obtaining a smaller buffer capacity and again upwardly when the dynamic part 11 is displaced to a position for obtaining a larger buffer capacity. Since the outer vertical guide 17 of the dynamic part 11 is located at a side of the outer vertical guide 20 which is directed to the inner side of the U-shape, the outer vertical guide 20 of the static part 10 does not require adjustment.

In an alternative embodiment (not shown) it is possible to mount the inner vertical guide 19 of the static part 10 to the dynamic part and to move it in the direction of displacement, for example telescopically.

Figure 22:
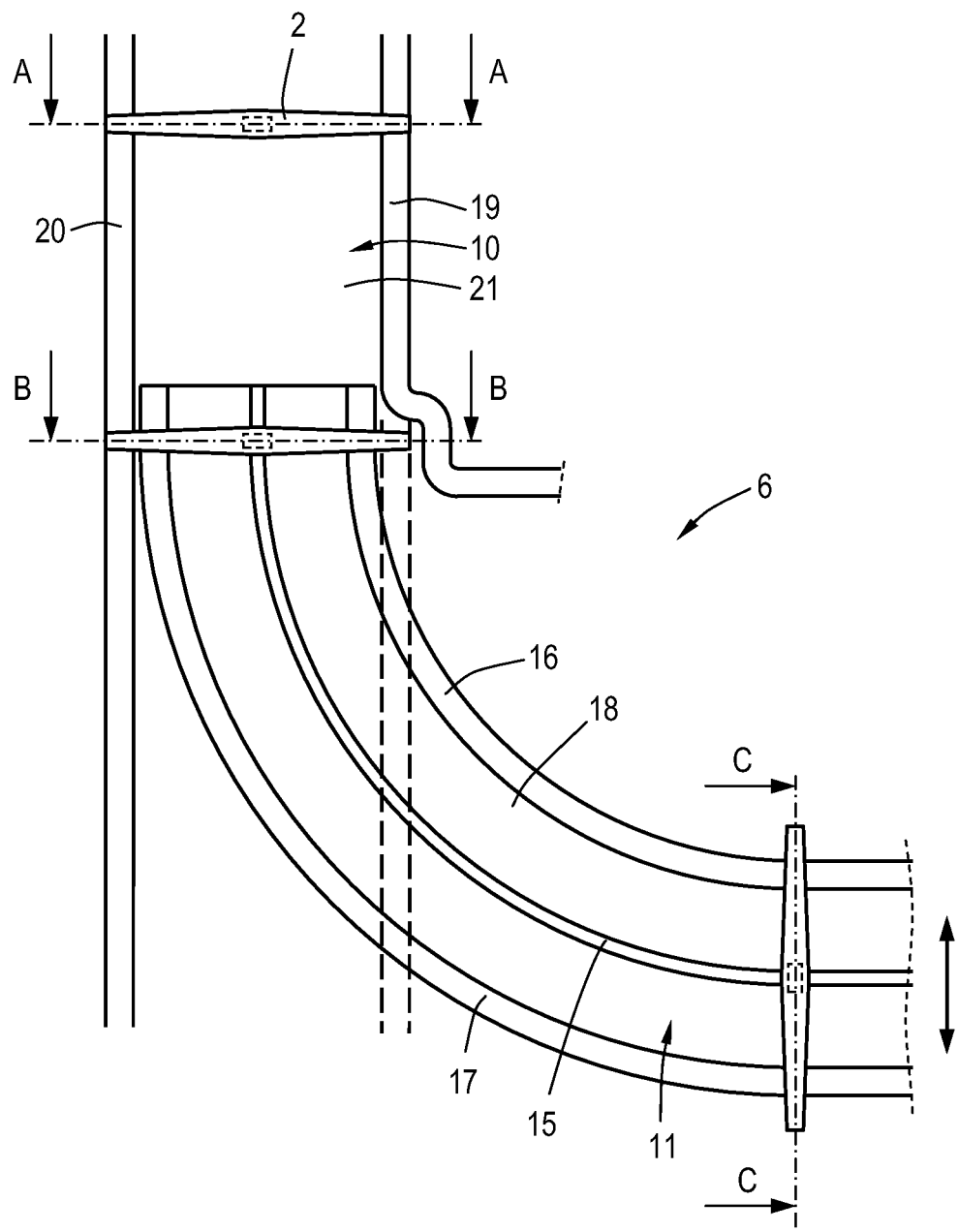
FIGS. 22-25, 26-29 and 30-33 are the same views as FIGS. 18-21 of alternative embodiments.
Figure 23:
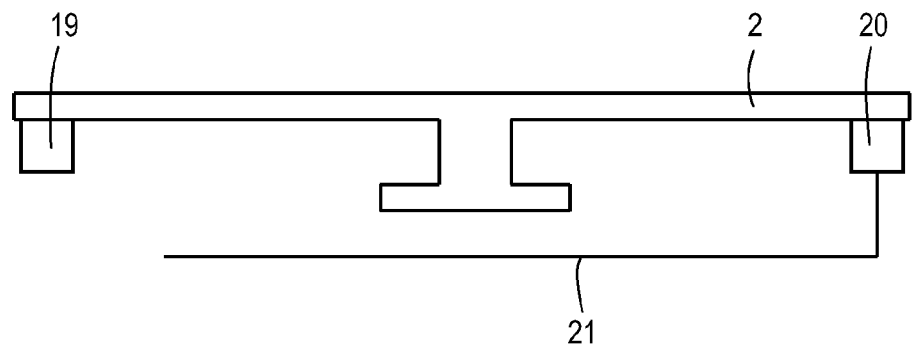
Figure 24:
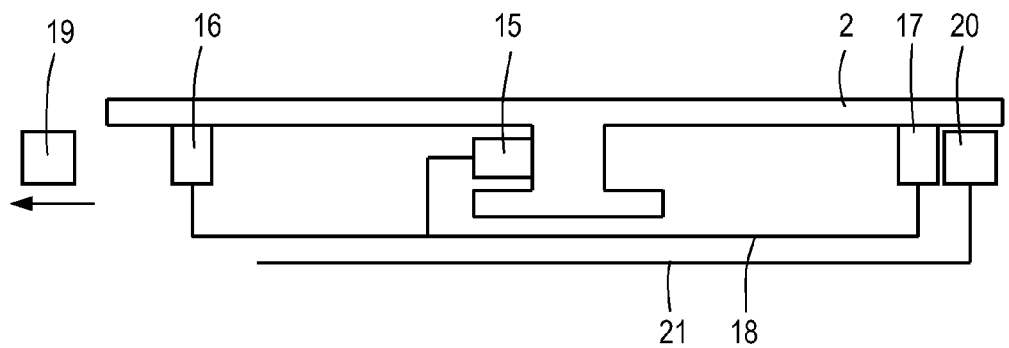
Figure 25:
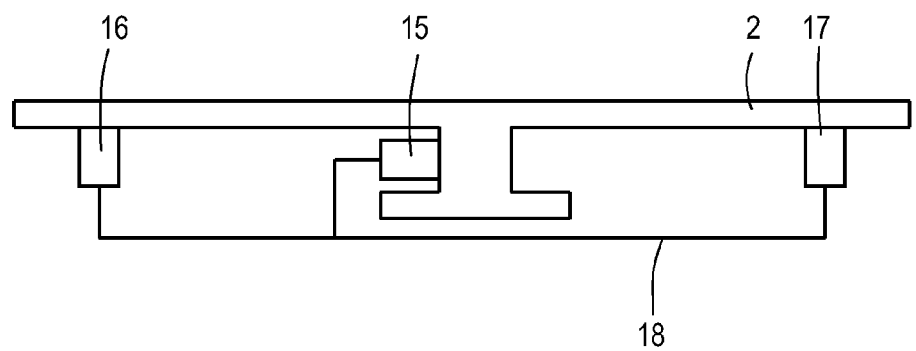
Figure 26:
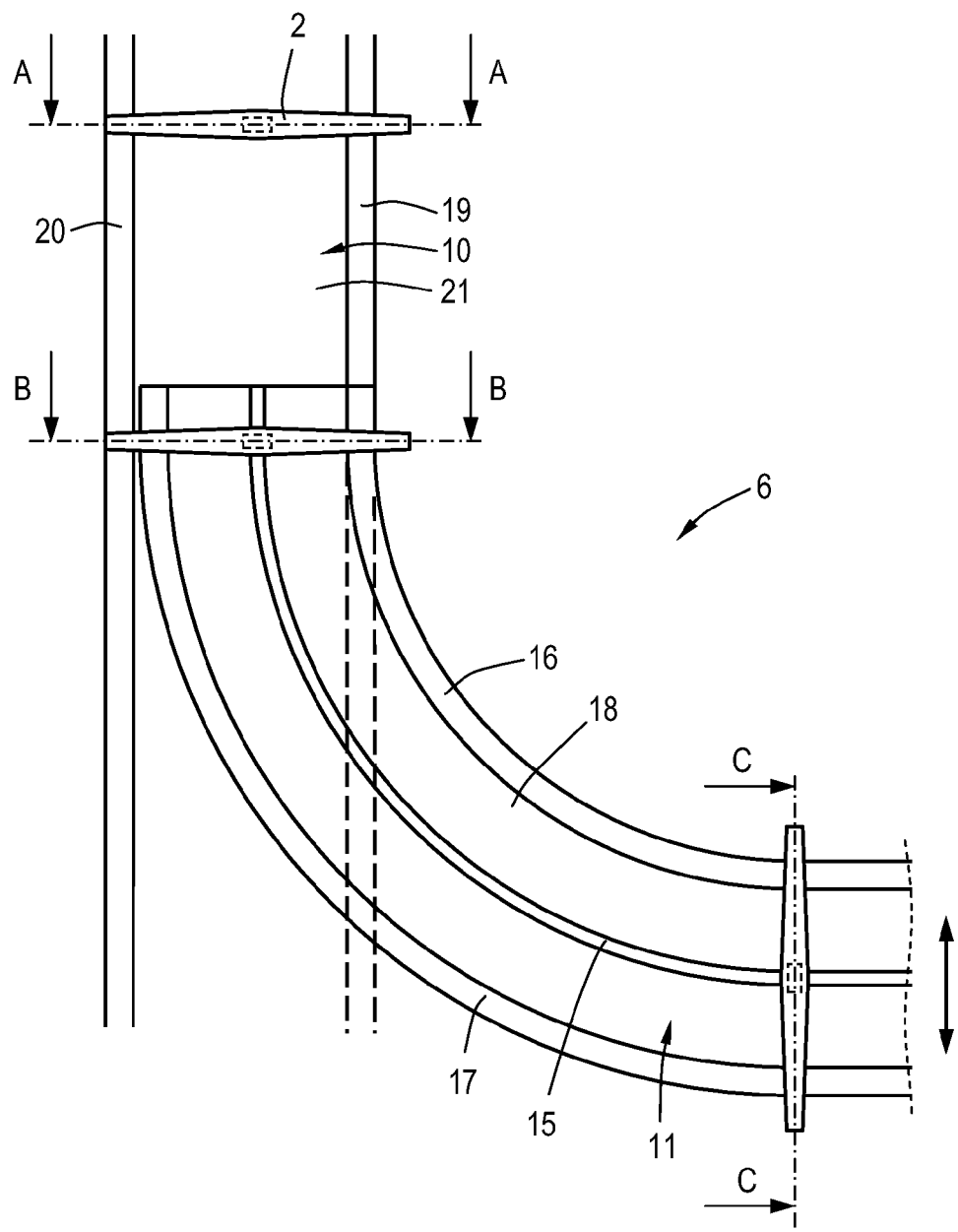
Figure 27:
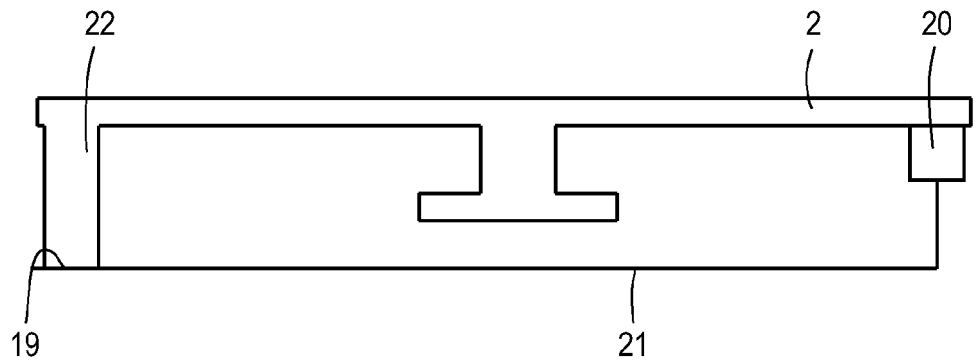

FIGS. 22-25 show an embodiment which is comparable with FIGS. 18-21, but in this case the inner vertical guide 19 of the static part 10 is displaceable in lateral direction, such as indicated by means of an arrow in FIG. 24. It is conceivable, for example, that the inner vertical guide 19 is flexible, such as illustrated in FIG. 22 and can be rolled up, for example.

Figure 28:
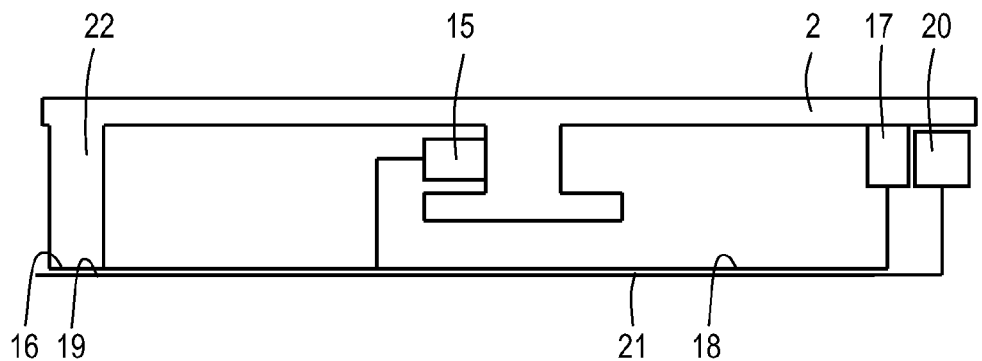
Figure 29:
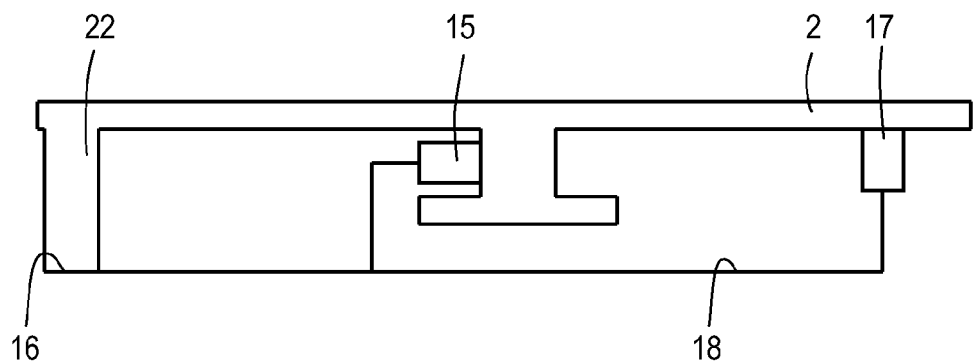

FIGS. 26-29 show an alternative embodiment, wherein the inner vertical guide 19 of the static part 10 is formed by a portion of the upper surface of the plate 21 and the inner vertical guide 16 of the dynamic part 11 is formed by a portion of the upper surface of the plate 18. FIG. 28 shows that at the dynamic part 11 the plate 21 of the static part 10 lies below the plate 18 of the dynamic part 11. The lower side of the inner curve portion of the conveyor belt 2 has a projection 22 which is located at the inner vertical guide 16 of the dynamic part 11 and the inner vertical guide 19 of the static part 10. At the transfer from the static part 10 to the dynamic part 11 and in reverse direction the conveyor belt 2 must follow a small height step.

Figure 30:
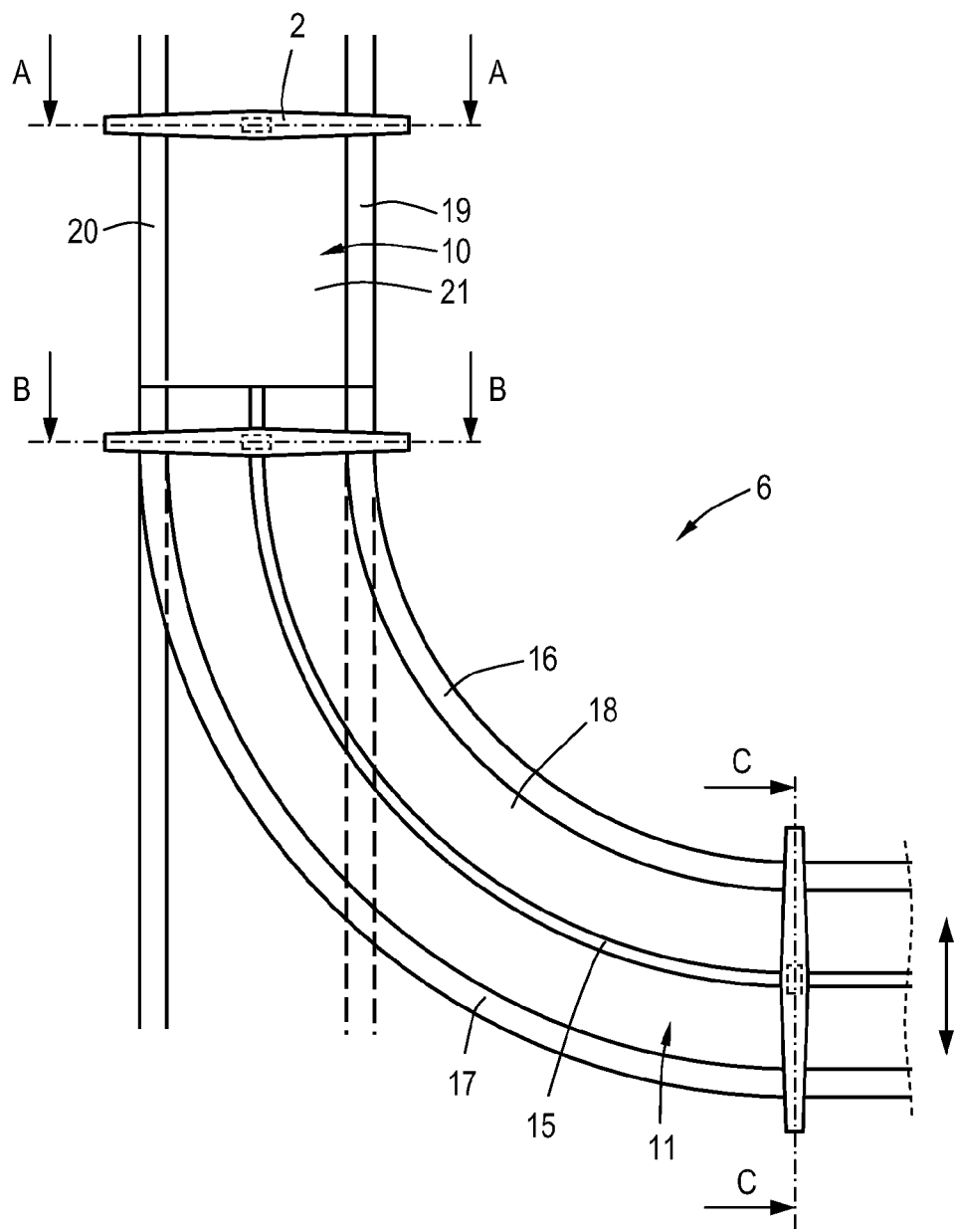
Figure 31:
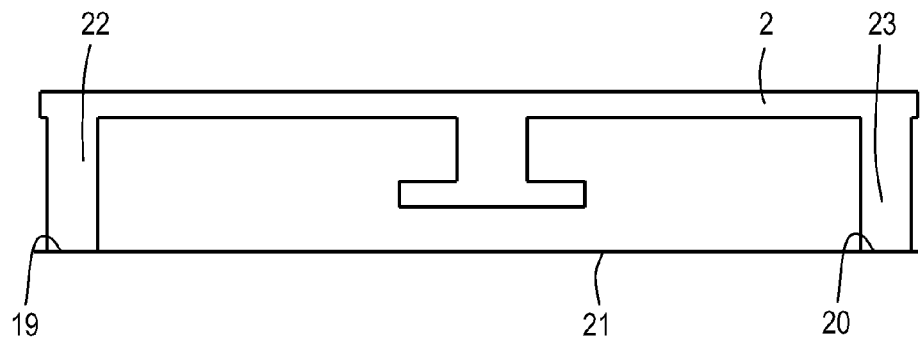
Figure 32:
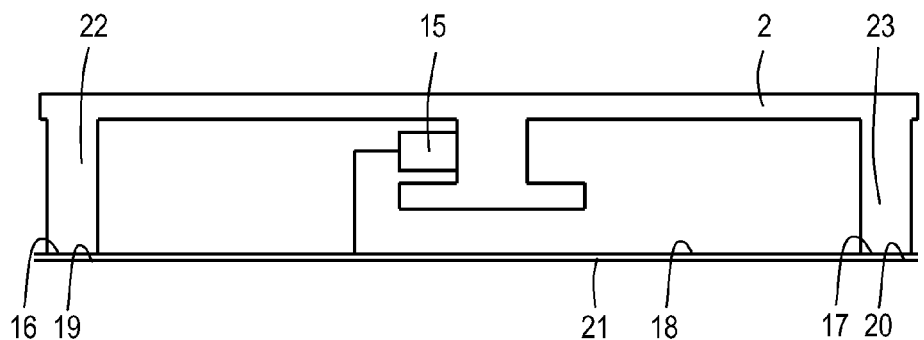
Figure 33:
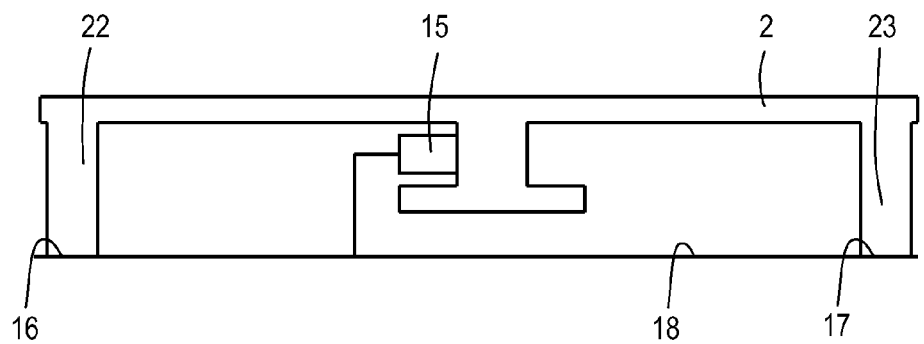

FIGS. 30-33 show an alternative embodiment wherein the lower side of the outer curve portion of the conveyor belt 2 is also provided with a projection. FIG. 30 shows that the inner vertical guides 19, 16 of the static part 10 and the dynamic part 11 are aligned in the direction of conveyance of the conveyor belt 2 at the transfer between the static part 10 and the dynamic part 11. The same applies for the outer vertical guides 20, 17.

Figure 34:
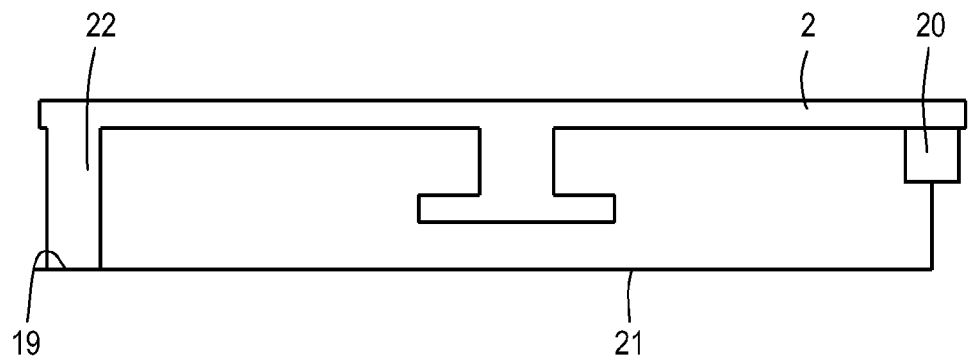
FIGS. 34-36 are similar views as FIGS. 27-29 of an alternative embodiment.
Figure 35:
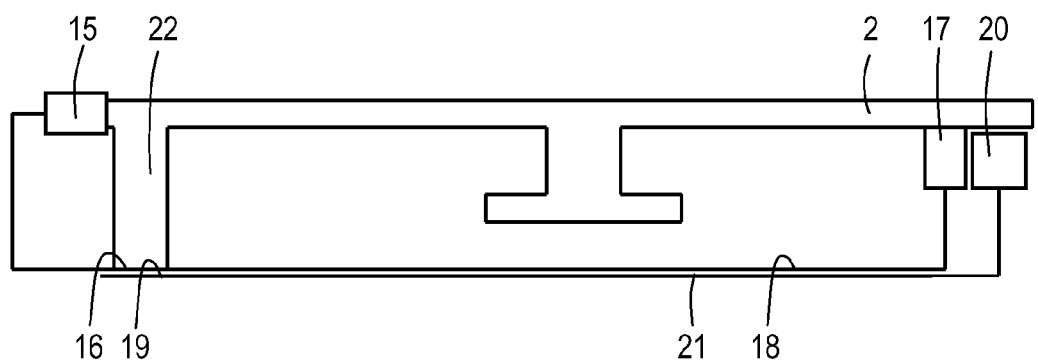
Figure 36:
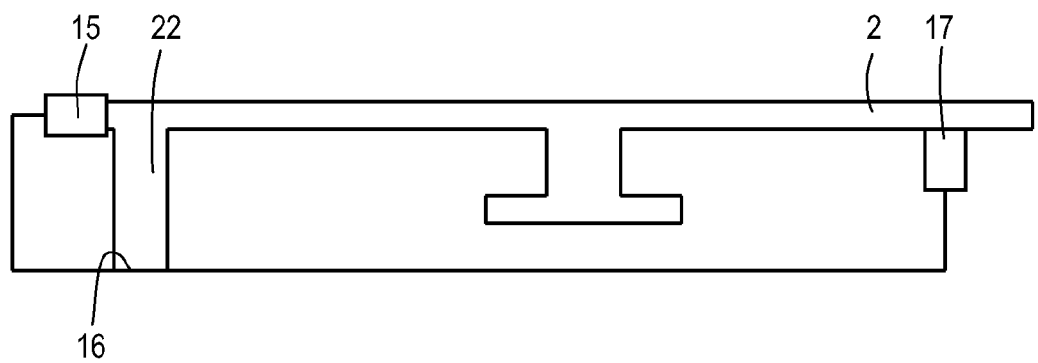

The radial guide 15 can also engage at another location of the conveyor belt 2, see for example the alternative embodiment according to FIGS. 34-36. Compared to the embodiment according to FIGS. 27-29 the conveyor belt 2 is supported and guided at the inner bend. Numerous alternative locations of engagement in horizontal direction remote from the centerline of the conveyor belt 2 are conceivable.

Figure 37:
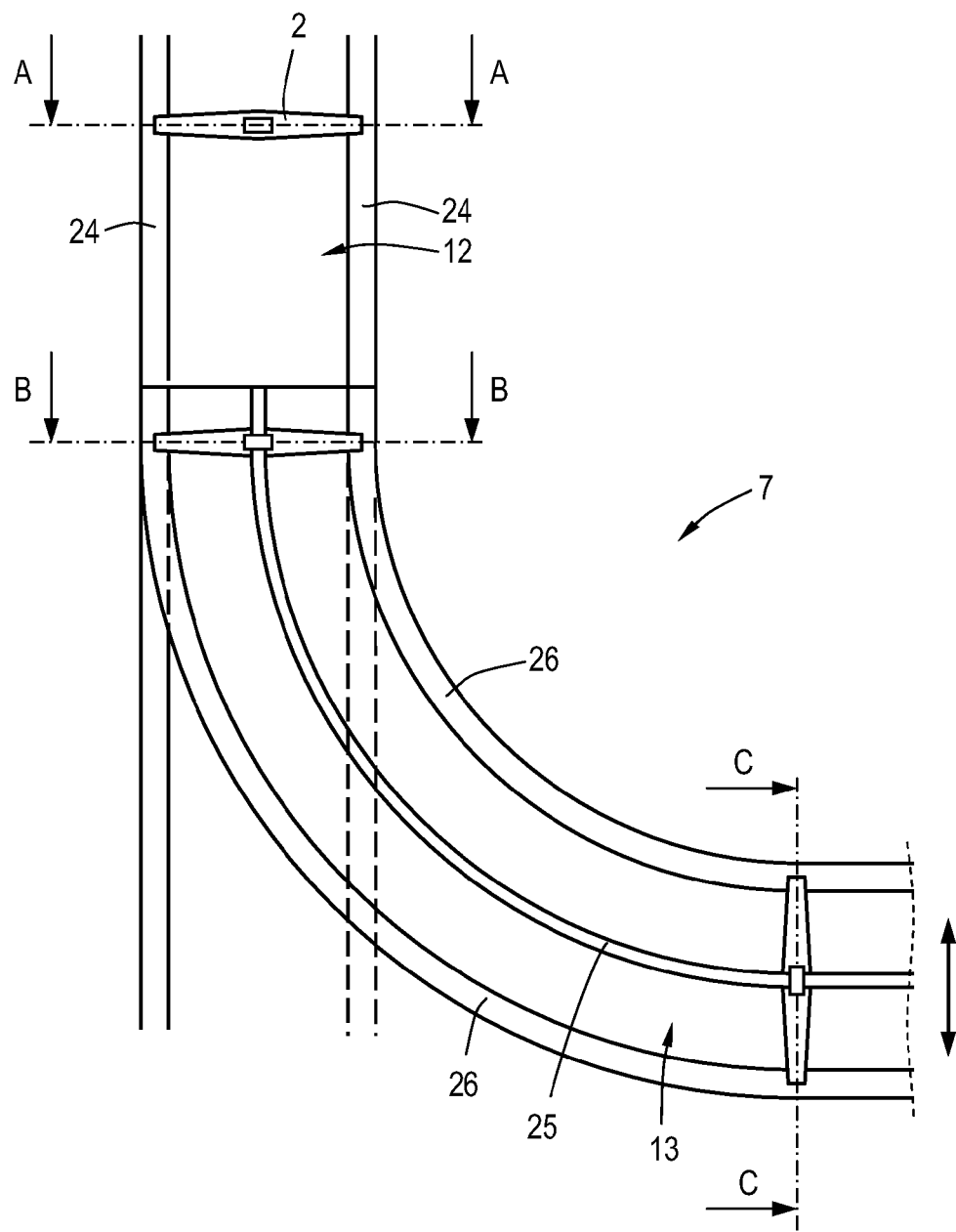
FIG. 37 is a detailed cut-away plan view of a part of an embodiment of an accumulating portal conveyor, showing the return path.
Figure 38:
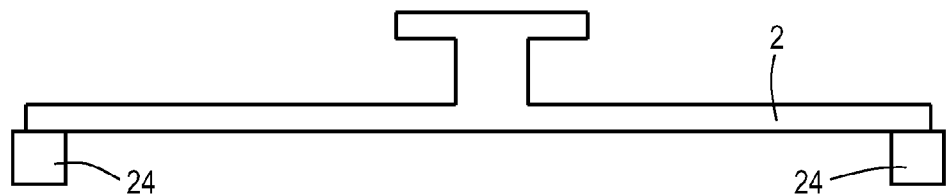
FIGS. 38-40 are enlarged cross-sectional views of the embodiment according to FIG. 37 along the respective lines AA, BB and CC in FIG. 37.
Figure 39:
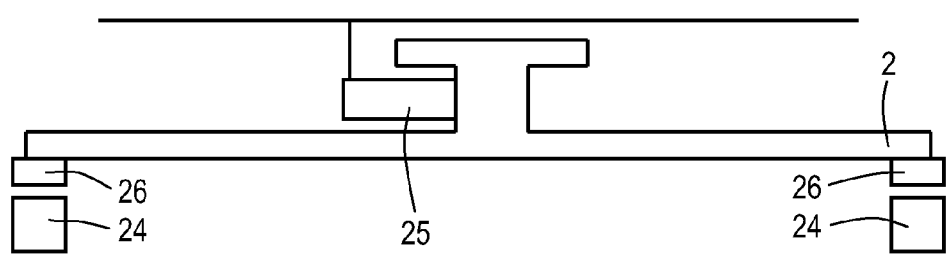
Figure 40:
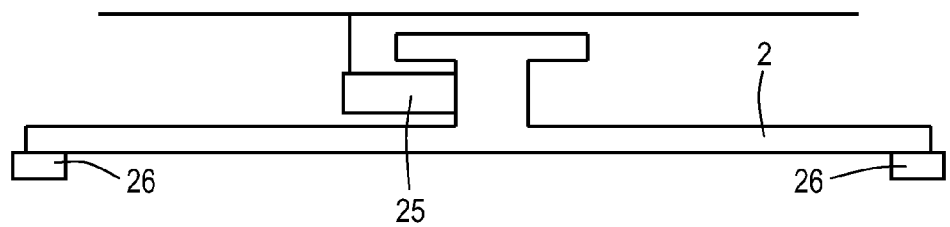

The support and guide of the conveyor belt 2 in the return path 7 at the transfer between the static part 12 and the dynamic part 13 is simpler than in the bridging path 6. In the return path 7 the conveyor belt 2 suspends upside down at the transfer and does not support articles. Since the conveyor belt 2 is relatively wide in this case it is preferably supported at its lateral edge portions. At the static part 12 it can be configured by means of vertical return guides 24 such as shown in cross-section in FIG. 38 and in plan view in FIG. 37. A radial return guide 25 is present at the dynamic part 13 of the return path 7 in order to guide the conveyor belt 2 through the bend. Furthermore, the dynamic part 13 is provided with vertical return guides 26 for supporting the conveyor belt 2 in upward direction. As shown in FIG. 39 the vertical return guides 24 of the static part 12 are located below the vertical return guides 26 of the dynamic part 13 in this case, but it could be reversed as long as the radial return guide 25 lies higher than the vertical return guide 24 of the static part 12. The cross-section according to FIG. 40 shows that in the base leg 7c of the dynamic part 13 of the return path 7 side edge portions of the conveyor belt 2 are supported in vertical direction by respective vertical return guides 26.

The location of the vertical return guides 24, 26 can be changed in transverse direction of the conveyor belt 2. For example, a position can be selected where the upper side of the conveyor belt 2 is flat and does not have anti-slip relief such as in case of a lot of other conveyor belts.

Furthermore, the conveyor belt 2 will glide over the vertical return guides 26 in the bend of the U-shape. In an alternative embodiment the dynamic part 13 may be provided with a freewheel mechanism (not shown), which displaces the vertical return guides 26 in at least a portion of the bend downwardly in order to allow the conveyor belt 2 to run free there.

Figure 41:
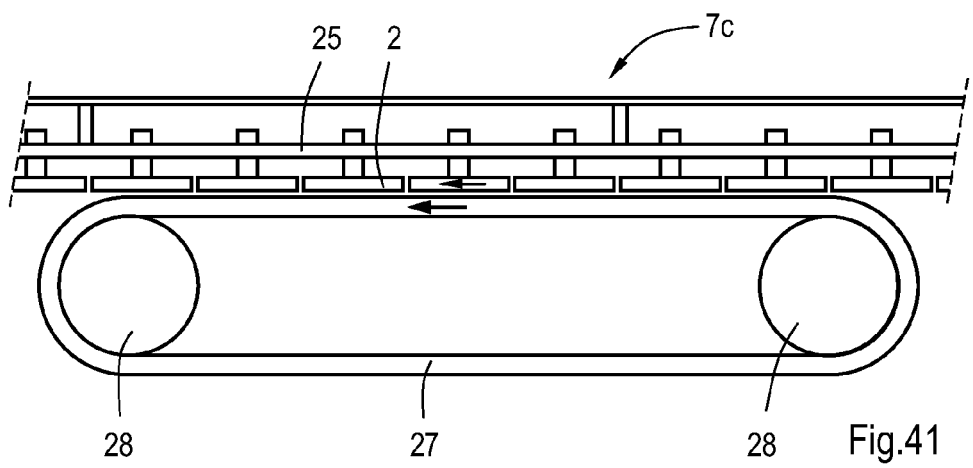
FIG. 41 is a side view of a part of an embodiment of the accumulating portal conveyor.

It is also possible to dispose a vertical support belt below the conveyor belt 2 which moves together with the conveyor belt 2, possibly only in the non-linear portions of the return path 7. This may be an endless support member, for example, which is guided about reversing wheels and which has an upper section between the reversing wheels which contacts the upper side of the conveyor belt 2. FIG. 41 shows a side view of a portion of an embodiment of the return path 7 at the base leg 7c of the U-shaped dynamic part 13. Similar as can be seen in FIGS. 39 and 40, the conveyor belt 2 comprising slats is guided along the radial return guide 25. The conveyor belt 2 is supported in upward direction by a vertical return guide in the form of a drivable endless support member 27. The support member 27 is guided about reverse wheels 28. An upper section of the support member 27 between the reversing wheels 28 contacts the downwardly directed upper side of the conveyor belt 2. Arrows in FIG. 41 indicate that the support member 27 is driven in the same direction as the conveyor belt 2.

Possibly the conveyor belt 2 is not upwardly supported in the return path 7, but it is only supported near a guide in order to bring the sagging conveyor belt 2 in the guide.

Aspects of the invention are not limited to the embodiments shown in the drawings and described hereinbefore, which may be varied in different manners within the scope of the invention. For example, it is conceivable that the guides are not sliding guides, but configured with rollers. Furthermore, the embodiments as shown and described are also applicable for a buffer conveyor, which is not provided with helical paths, i.e. a buffer conveyor of which the helical paths and the bridging path together form a transport path which is provided with a return path, for example a linear buffer conveyor. Such a buffer conveyor can have a variable buffer function with the static and dynamic parts as shown and described.

What is claimed is:

1. An accumulating portal conveyor, comprising:
   a drivable endless conveyor belt,
   a frame configured to support and guide the conveyor belt, which frame is provided with a first helical path and a second helical path which lies at a distance from the first helical path, a bridging path and a return path, which are arranged such that under operating conditions the conveyor belt successively follows the first helical path upwardly, the bridging path, the second helical path downwardly and the return path, and such that in a transverse direction of an upright plane through central centerlines of the first and second helical path a free passage below the bridging path and between the helical paths is provided, wherein the bridging path is provided with a static part having a fixed position with respect to the helical paths and a dynamic portion which is displaceable in a transverse direction of the upright plane so as to be able to change the path length of the conveyor belt between the helical paths, and wherein at least a portion of the return path is displaceable with respect to the helical paths for compensating the change of the path length of the conveyor belt at the bridging path;
   wherein the static part of the bridging path has two parallel legs which extend in a transverse direction of the upright plane and the dynamic part of the bridging path has a U-shape including two parallel legs as seen from above, wherein the dynamic part is displaceable in a longitudinal direction of the parallel legs and the respective legs of the static part and dynamic part cooperate for supporting and guiding the conveyor belt via the U-shape in different positions of the dynamic part.

2. The accumulating portal conveyor according to claim 1, wherein the return path is also provided with a static part which has a fixed position with respect to the helical paths and a dynamic part which is displaceable in a transverse direction of the upright plane.

3. The accumulating portal conveyor according to claim 2, wherein the dynamic part of the bridging path and the dynamic part of the return path are arranged such that they move in opposite directions upon changing the path length of the conveyor belt at the bridging path under operating conditions.

4. The accumulating portal conveyor according to claim 2, wherein the return path is located at least in a portion between the first and second helical path below the bridging path and is configured such that the free passage between the helical paths below the return path is provided.

5. The accumulating portal conveyor according to claim 4, wherein the return path between the helical paths is at least partially directly below the bridging path.

6. The accumulating portal conveyor according to claim 2, wherein the dynamic part of the bridging path and the dynamic part of the return path are arranged such that they move in the same direction upon changing the path length of the conveyor belt along the bridging path under operating conditions.

7. The accumulating portal conveyor according to claim 6, wherein the return path between the helical paths is, at least partially, at substantially the same vertical height as the bridging path.

8. The accumulating portal conveyor according to claim 1, wherein the U-shaped dynamic part is provided with a radial guide configured to support the conveyor belt in a radial direction via the U-shape, an outer vertical guide configured to support an outer curve portion of the conveyor belt in an upward direction, an inner vertical guide configured to support an inner curve portion of the conveyor belt in an upward direction, wherein the outer vertical guide and inner vertical guide support opposite side edge portions of the conveyor belt, wherein the static part is provided with an outer vertical guide configured to support an outer edge portion of the conveyor belt in an upward direction and an inner vertical guide configured to support an inner edge portion of the conveyor belt in upward direction, such as seen from the inner side of the U-shape, wherein at the dynamic part at least the inner vertical guide of the static part is free from the dynamic part.

9. The accumulating portal conveyor according to claim 8, wherein an adjusting device is configured to displace the inner vertical guide of the static part at the dynamic part in a vertical direction upon displacing the dynamic part.

10. The accumulating portal conveyor according to claim 8, wherein an adjusting device is configured to displace the inner vertical guide of the static part at the dynamic part in a lateral direction upon displacing the dynamic part.

11. The accumulating portal conveyor according to claim 8, wherein at least a portion of the inner vertical guide of the static part is connected to the dynamic part in such a manner that the inner vertical guide also displaces in the direction of displacement of the dynamic part.

12. The accumulating portal conveyor according to claim 8, wherein the inner vertical guide of the static part lies at the dynamic part below the dynamic part.

13. The accumulating portal conveyor according to claim 12, wherein the lower side of the conveyor belt has a projection at the inner vertical guide.

14. The accumulating portal conveyor according to claim 8, wherein the radial guide is located between the outer vertical guide and the inner vertical guide in horizontal direction, or wherein the radial guide is located at a side of the inner vertical guide facing the inner side of the U-shape in horizontal direction.

15. The accumulating portal conveyor according to claim 8, wherein at least at the dynamic part the outer vertical guide of the static part is located beyond the outer vertical guide of the dynamic part in horizontal direction, as seen from the inner side of the U-shape.

16. The accumulating portal conveyor according to claim 8, wherein the conveyor belt, at least at a portion of the return path where the conveyor belt suspends upside down, is supported in upward direction by a vertical return guide, wherein the vertical return guide comprises an endless support member, which is guided about rotatable reversing wheels, wherein an upper section of the support member extending between the reversing wheels supports the conveyor belt.

17. The accumulating portal conveyor according to claim 16, wherein the endless support member is drivable such that the upper section is driven in the same direction as the supported conveyor belt.

* * * * *